Dec. 29, 1931.  W. J. MILLER  1,838,277
METHOD OF AND APPARATUS FOR FORMING AND APPLYING APPENDAGES
TO WARE IN THE MANUFACTURE OF POTTERY
Filed March 30, 1928   9 Sheets-Sheet 2

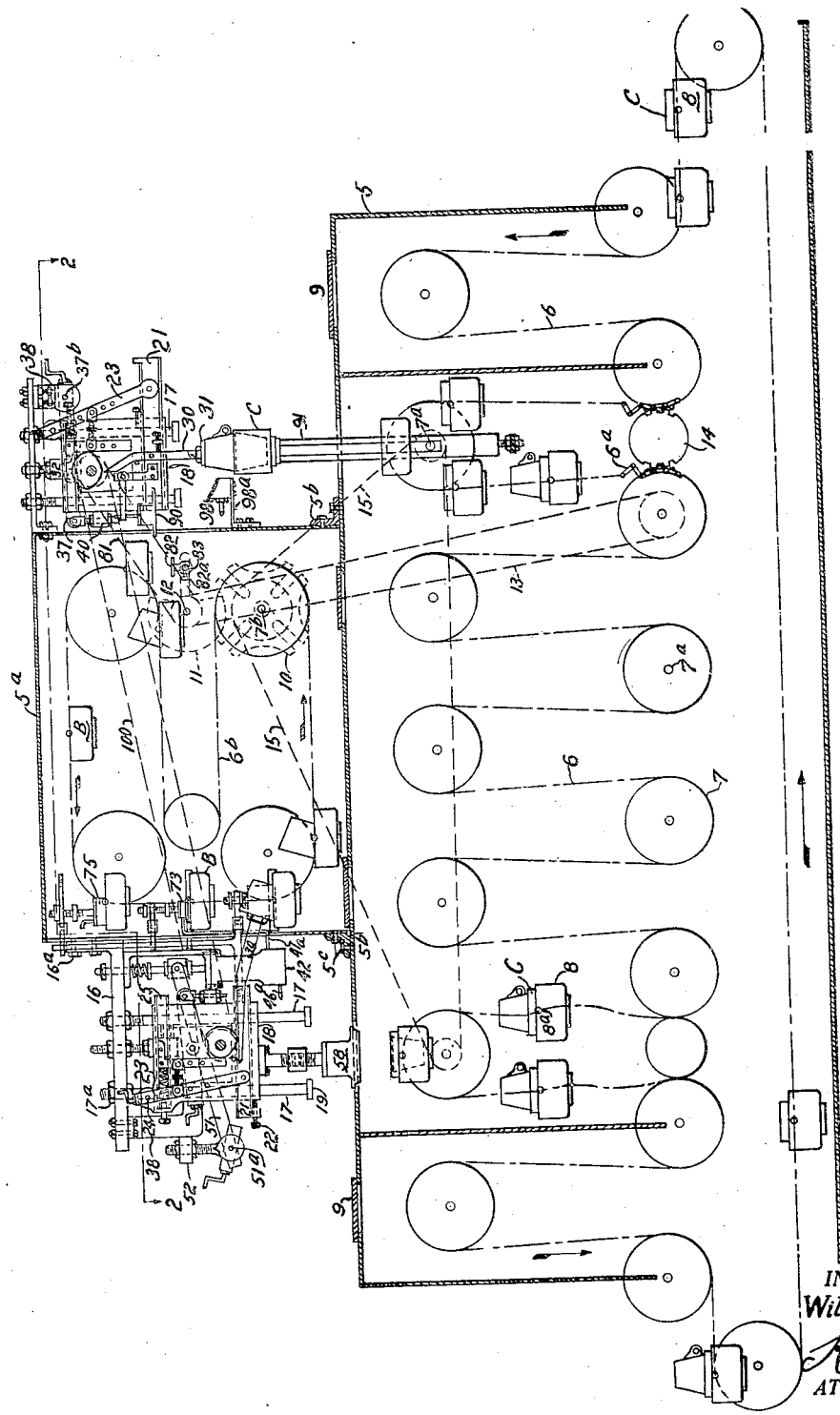

Fig. 1ª.

INVENTOR.
William J. Miller
BY
ATTORNEY.

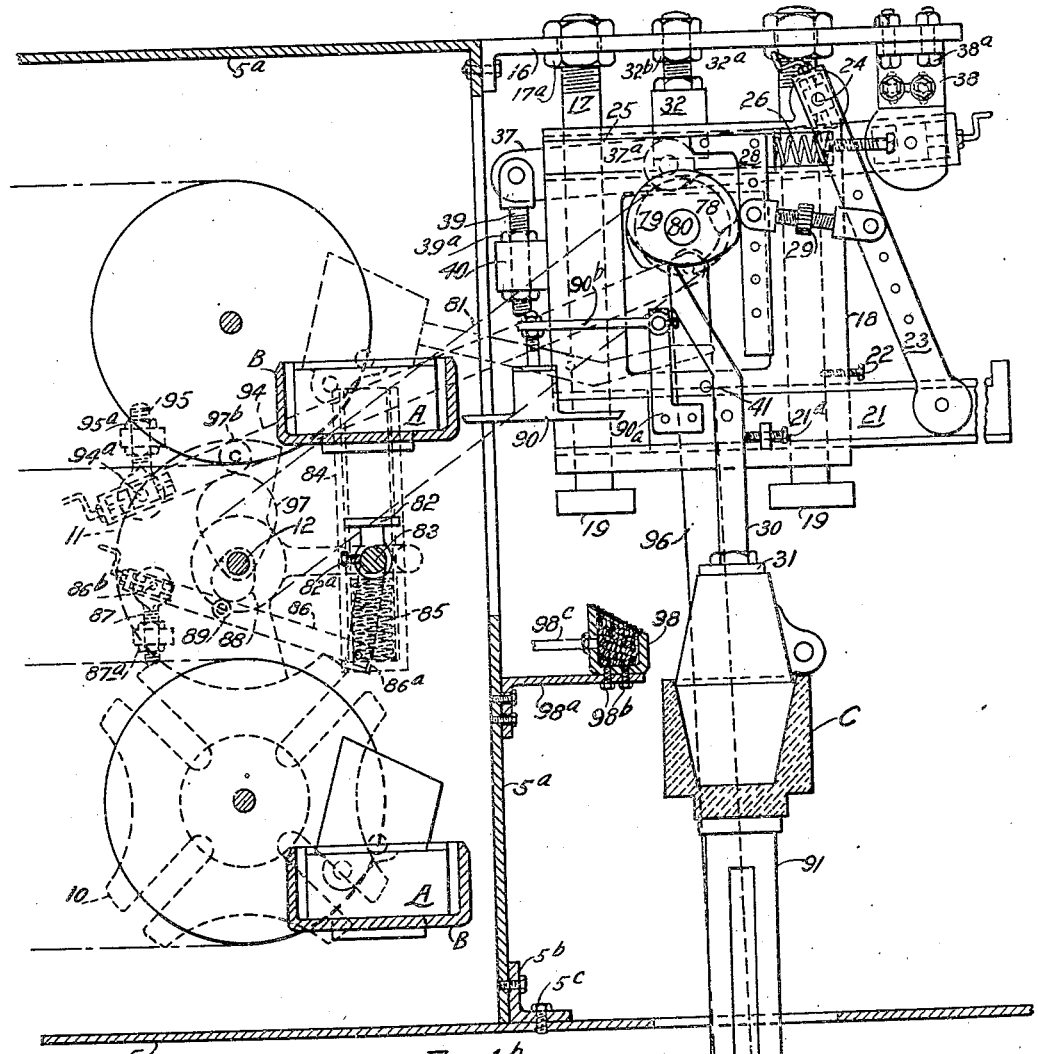
Fig. 1.b
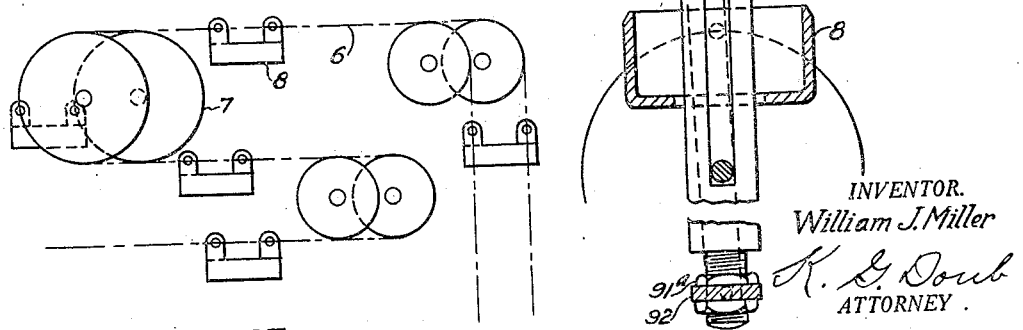
Fig. 27.

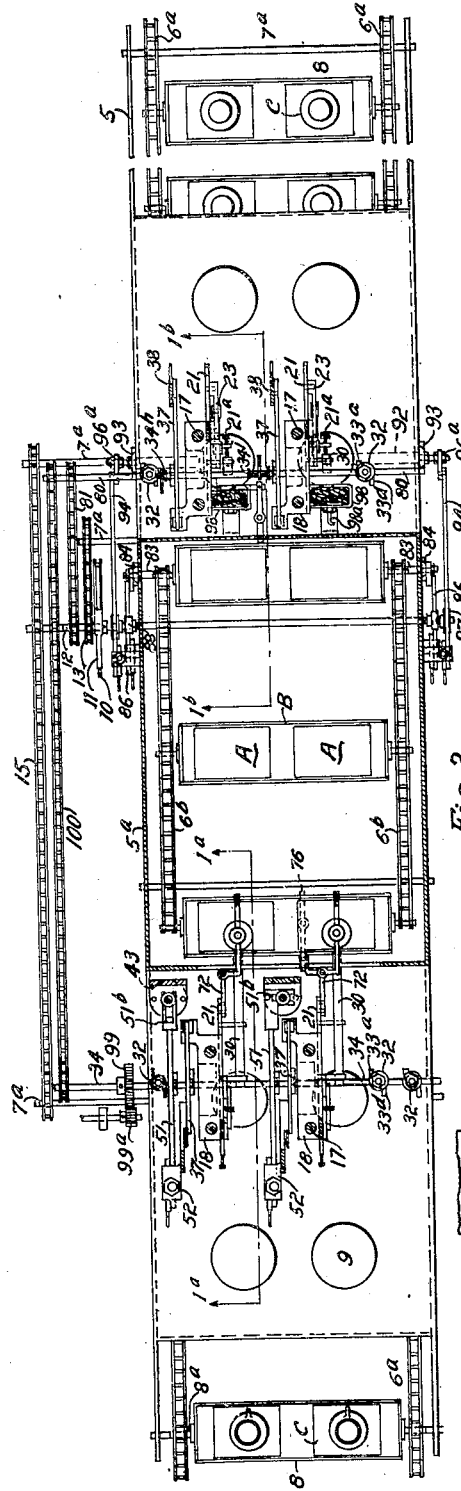

Dec. 29, 1931.   W. J. MILLER   1,838,277
METHOD OF AND APPARATUS FOR FORMING AND APPLYING APPENDAGES
TO WARE IN THE MANUFACTURE OF POTTERY
Filed March 30, 1928   9 Sheets-Sheet 5

INVENTOR.
William J. Miller
BY
ATTORNEY

Dec. 29, 1931.   W. J. MILLER   1,838,277
METHOD OF AND APPARATUS FOR FORMING AND APPLYING APPENDAGES
TO WARE IN THE MANUFACTURE OF POTTERY
Filed March 30, 1928   9 Sheets-Sheet 6

INVENTOR.
William J. Miller
BY
ATTORNEY.

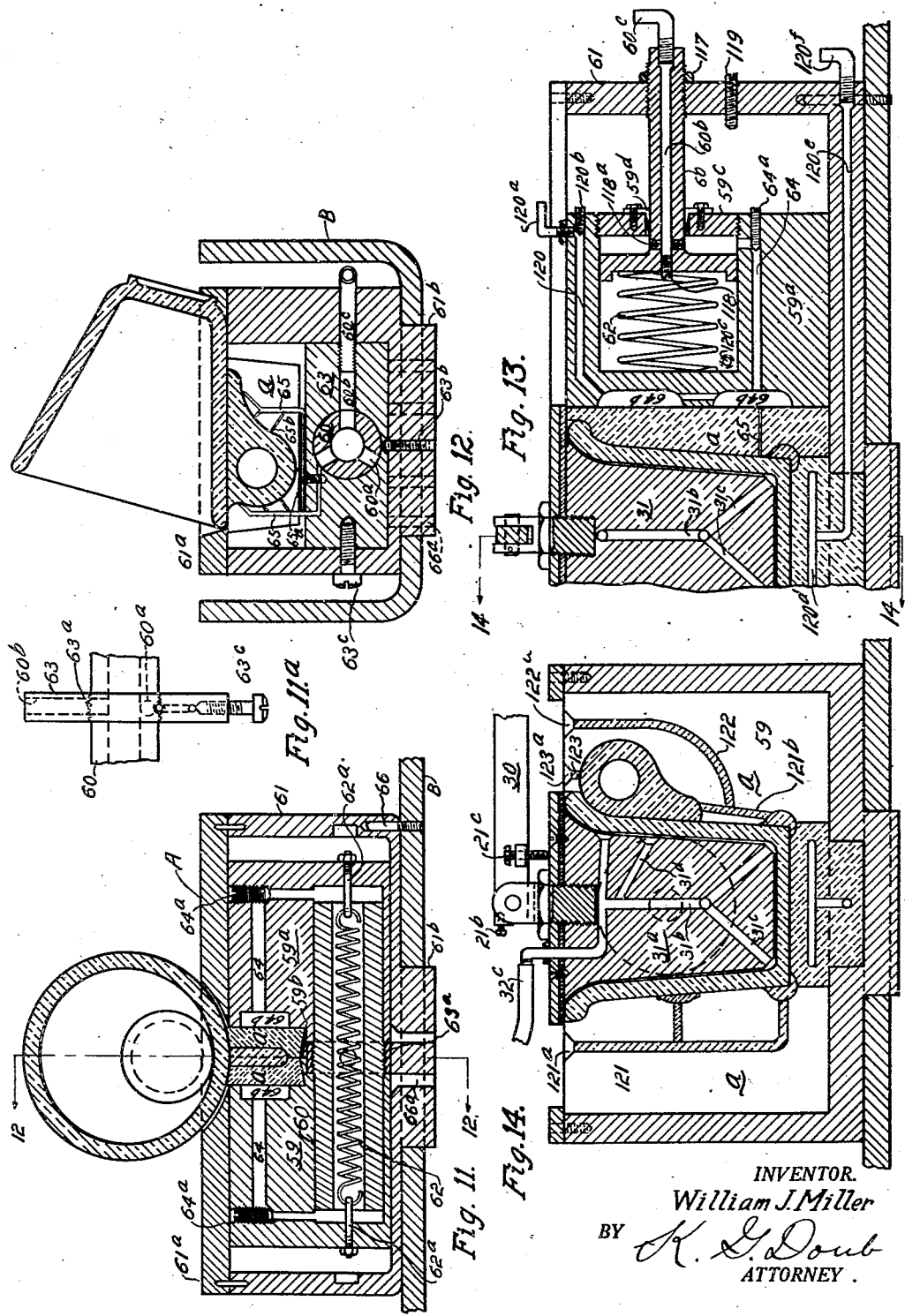

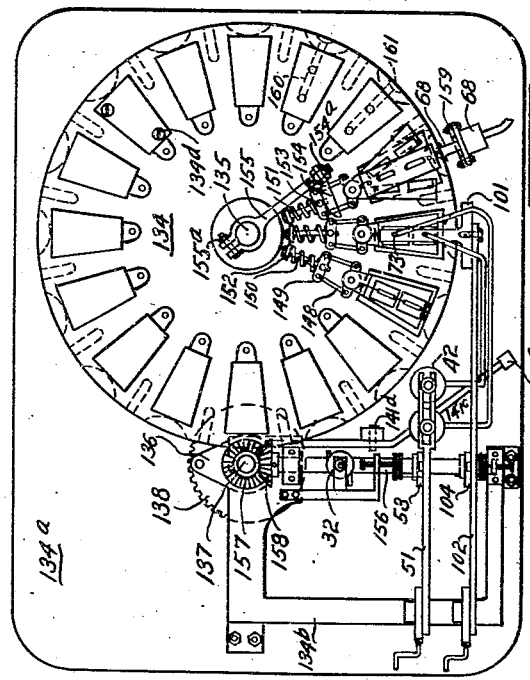

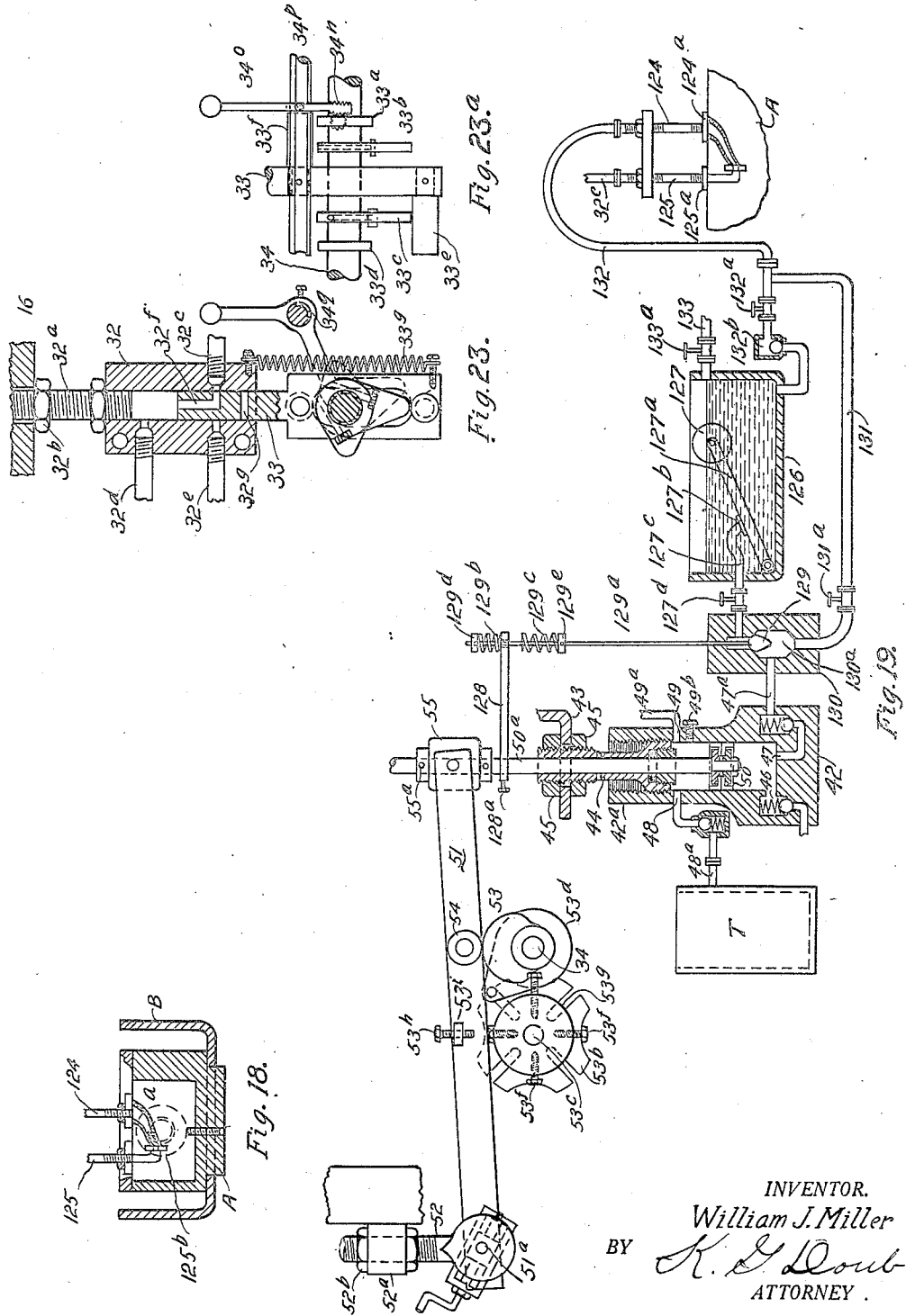

Patented Dec. 29, 1931

1,838,277

UNITED STATES PATENT OFFICE

WILLIAM J. MILLER, OF SWISSVALE, PENNSYLVANIA

METHOD OF AND APPARATUS FOR FORMING AND APPLYING APPENDAGES TO WARE IN THE MANUFACTURE OF POTTERY

Application filed March 30, 1928. Serial No. 266,020.

This invention relates to a method of and apparatus for forming and applying appendages such as handles, spouts, decorative figures and the like to ware in the maufacture of pottery.

The principal object of the invention is to provide means whereby appendages such as handles, spouts, or any desired embellishment or decorative figure may be automatically formed or cast and applied to pottery ware.

Generally stated, but subject to variation within the scope of the invention, the method consists in charging a mold, for instance a handle or figure mold,—which may be of the partible type in instances where required,—with clay in a fluid or semi-fluid state, and then placing the ware in or on the mold against the handle or figure, the ware remaining in or on the mold until the clay sets, the mold being subsequently parted if of the partible type and the ware with the handle or figure attached thereto removed from said mold and, if preferred, boxed, apparatus being provided which enables the several operations to be performed automatically, the ware preferably being handled or figured or embellished while in a leather-hard condition and while being conveyed through a drier.

Among the advantages which result from the foregoing method is that the general appearance and condition of the ware is improved, due to the fact that the ware and handle or figure may be joined when the handle or figure is in such a plastic state as will eliminate crevices at the lines of jointure and ensure a more firm securement of the handle or figure relatively to the ware, and also in view of fact that the handle or other desired appendage may be applied in alinement relatively to each article of ware, thus ensuring uniformity of attachment and which cannot be obtained by methods as commonly practiced so far as known.

Another advantage is that decorative figures, rings and other embellishments may be formed or cast on jiggered as well as cast ware.

When casting ware having handles, spouts, decorative figures and like utility and ornamental surface irregularities as commonly practiced, the slip solidifies or sets to an equal thickness against all portions of the walls of the mold, so that when the excess slip is poured from the mold, cavities are formed or result at the thickened portions of the walls of the ware or where the handle, spout or figure is cast integral with the ware, and these cavities are generally patched up or filled manually with stiffer clay than the casting slip, which requires skilled labor and involves expense and ofttimes results in ware lacking in uniformity. A further advantage of the present method is that by first casting the handles, spouts, decorative figure or the like and subsequently applying or joining the ware thereto, such cavities as just specified are eliminated and a uniform grade of ware produced.

Among the other objects of the invention are to provide improved means for charging the mold with the plastic material; to provide improved casting means; to provide means for manufacturing the appendages to be applied to the ware; to provide means for boxing the ware; to provide improved molds; and to provide means for drying the ware during manufacture. Other objects will appear during the description of my novel process and apparatus and will be more clearly set forth in the claims.

The apparatus by which the improved method may be practiced also includes numerous advantageous features, among which may be mentioned the provision for adjustment both while the mechanism is in operation and at rest, so that the various operations may be readily timed and synchronized and the charges of clay measured without cessation of operation.

With the foregoing and numerous other important objects and advantages in view, the invention consists in the preferred construction and arrangement of parts which will be more fully hereinafter described and claimed.

In the drawings:

Figure 1 is a view, principally in side elevation, of a structure which may be adopted in carrying out the method hereinafter described, said structure being applied in operative relation to a drier and the side wall of the latter shown removed to disclose the interior of the drier;

Figs. 1ª and 1ᵇ are enlarged views in section and side elevation taken substantially on the lines 1ª—1ª and 1ᵇ—1ᵇ, respectively, Fig. 2, only the upper portion of the lower drier being shown;

Fig. 2 is a horizontal sectional plan view taken on the line 2—2, Fig. 1;

Fig. 3 is an enlarged fragmentary detail view in section and side elevation of an adjustment structure;

Figure 24:
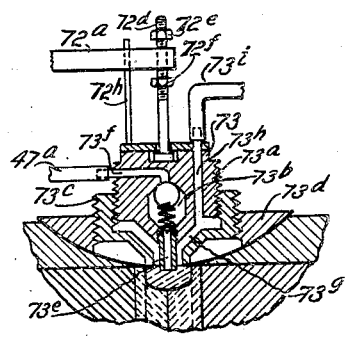
Figure 6:
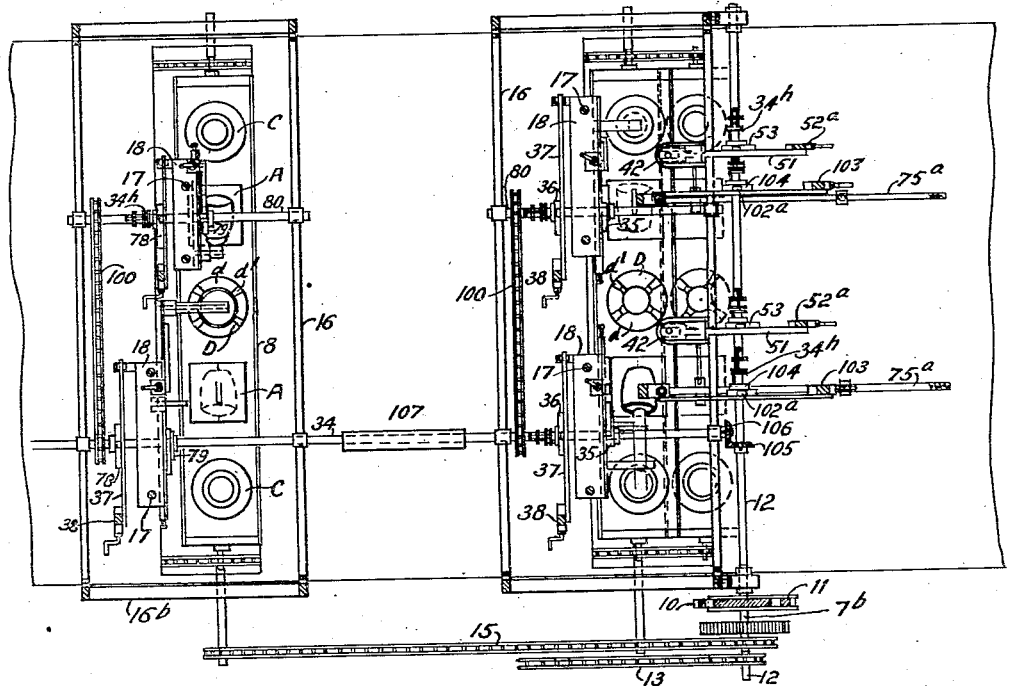
Figure 5:
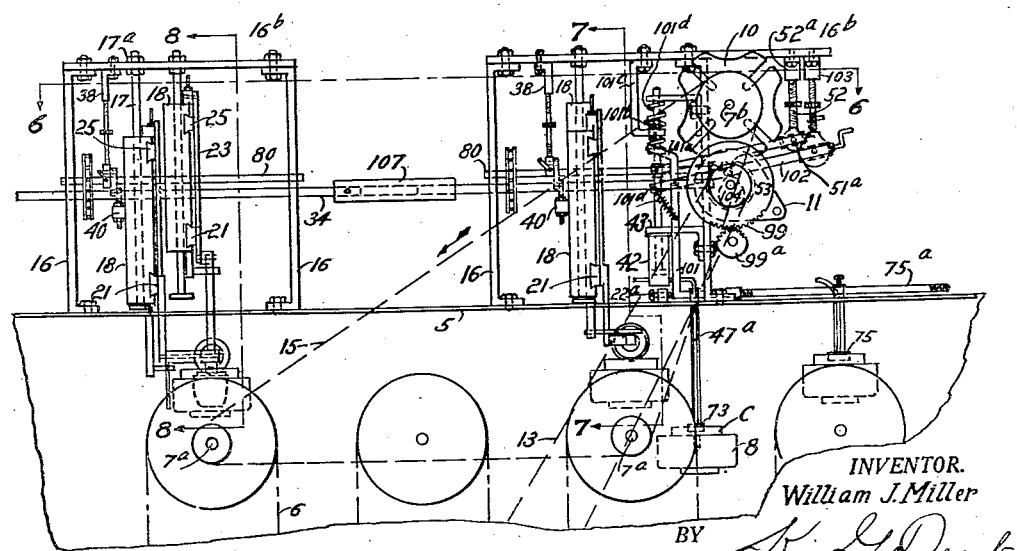
Figure 10:
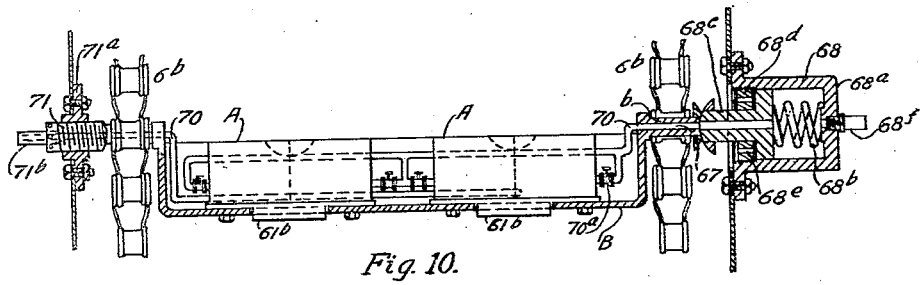
Figures 8, 9:
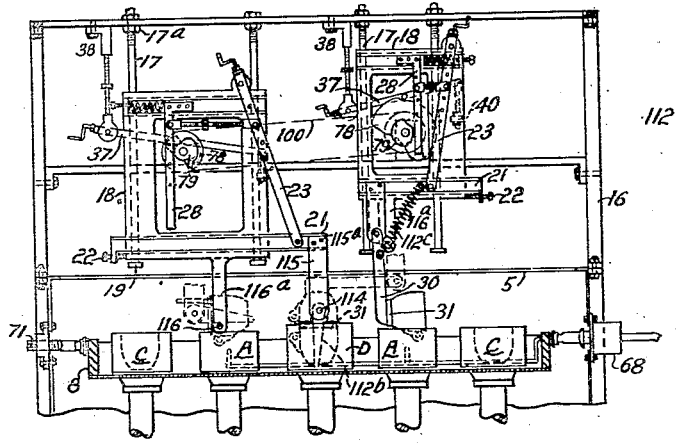

Fig. 3ª is a detail sectional view taken on the line 3ª—3ª, Fig. 3;

Fig. 4 is an enlarged fragmentary detail view in side elevation of a preferred construction for mounting the cams;

Fig. 4ª is an enlarged detail view in side elevation of a modification in structure relatively to Fig. 4;

Fig. 4ᵇ is a view taken on the line 4ᵇ—4ᵇ, Fig. 4ª;

Fig. 5 is a view principally in side elevation of a modification in structure;

Fig. 6 is a horizontal sectional plan view taken on the line 6—6, Fig. 5;

Fig. 7 is a sectional elevation taken substantially on the line 7—7, Fig. 5;

Fig. 7ª is an enlarged fragmentary detail view, partly in section, of a preferred assembly embodied in Fig. 7;

Fig. 8 is a view similar to Fig. 7, taken substantially on the line 8—8, Fig. 5;

Fig. 8ª is a view similar to Fig. 7ª of a type of assembly which may be embodied in Fig. 8;

Fig. 9 is an enlarged fragmentary detail transverse vertical sectional view of one type of ware transfer chuck or grip head;

Fig. 10 is a detail transverse vertical sectional view of a preferred form of registering device for applying super and/or sub-atmosphere to the casting molds or forms, a tray and a plurality of molds also being shown in section and side elevation;

Fig. 11 is an enlarged detail transverse vertical sectional view through a preferred form of handle and/or figure casting and applying mold;

Fig. 11ª is a detail plan view of an assembly;

Fig. 12 is a view taken on the line 12—12, Fig. 11;

Fig. 13 is a fragmentary detail view in transverse vertical section of a modified type of mold relatively to that illustrated in Figs. 11 and 12;

Fig. 14 is a view taken on the line 14—14, Fig. 13;

Fig. 15 is a view similar to Fig. 12, showing the mold adapted for a multiple of articles of ware;

Fig. 16 is a plan view of a mold adapted for a decorative figure;

Fig. 17 is a view in transverse vertical section of Fig. 16, showing an article of ware disposed on the mold;

Fig. 18 is a detail transverse vertical sectional view of a mold adapted for casting spouts, hollow handles and the like;

Fig. 19 is a detail fragmentary view in section and side elevation of a modified structure for applying casting clay or slip to the molds;

Fig. 20 is a plan view of a preferred adaptation of the invention to an annular or table conveyor for semi-automatic operation;

Fig. 21 is an enlarged detail plan view of one of the casting molds adapted for the conveyor of Fig. 20;

Fig. 22 is a fragmentary detail view in elevation of a clutch structure which may be embodied in Fig. 20;

Fig. 23 is a detail view in section and side elevation of a preferred type of valve structure and actuating cams;

Fig. 23ª is a fragmentary view in elevation of part of Fig. 23;

Fig. 24 is an enlarged detail view in transverse vertical section of a nozzle member;

Figs. 25 and 25ª are detail plan and edge views, respectively, of a jig for use in the manual application of handles to ware;

Figs. 26 and 26ª are detail views respectively in elevation and top plan of a further form of jig adapted for manual application of handles; and Fig. 27 illustrates in diagrammatic side elevation a method of hanging the mold-carrying trays.

The clay used in charging the molds as hereinafter described may be of varying degrees of plasticity or fluidity, as in some instances the clay which may be found most suitable may be the usual mixture of clay slip, while in other instances a relatively stiff mixture may be found more suitable, depending upon existing conditions and the character of the appendage to be applied or united to the ware. It may also be found desirable to include in the clay mixture a shrinkage-controlling agent with a view toward equalizing the relative shrinkage of the two bodies.

In order to gain a clear understanding of the ware manipulating structure which is preferably adopted in the present invention, reference is made to my copending application Serial No. 203,186, filed July 2, 1927, means for transferring ware in the manufacture of pottery. Reference is also made to my copending application Serial No. 202,629, filed June 30, 1927, for conveying mechanism.

The numeral 5 generally designates a drier, having therein a flexible conveyor generally indicated at 6, the conveyor shown being of the loop type to conserve space but it will be understood that the drier may be of the tunnel type and the conveyor of the straight line type, the invention being adapted for any desired construction of drier and conveyor, as will be apparent in view of the subsequent description. The conveyor 6 preferably comprises a pair of flexible chain members 6ª made up of links, a number of which are shown for the purposes of illustration in side elevation at the lower portion of Fig. 1, the chains being passed over and under sprockets 7 mounted on transverse shafts 7ª, which may have bearing in the sides of the drier or a suitable frame provided therefor. Mold-carriers or trays 8, illustrated in plan view in Fig. 2, are mounted transversely of the conveyor chains 6ª, said trays being provided with bearing trunnions 8ª by means of which the trays are swingably mounted in the chains 6ª, preferably above their centers of gravity or as shown in Fig. 27 so that they will always assume a horizontal position regardless of the direction of travel of the conveyor.

At the lower portion of Fig. 1 the conveyor is shown as extending beyond opposite ends of the drier, to indicate that the molds may be fed with clay and the latter formed into ware and other operations performed on the ware prior to entering the drier or after leaving the drier, these operations being either manual or automatic, and after the handle or decorative or other figure has been applied to the ware preferably while in what is termed in the pottery art as a "leather-hard" condition, the ware may be subjected to other desired operations, which may take place either inside or outside of the drier, as for example the ware may be turned prior to applying the handles or other figures thereto, and in the event it is desired to turn the ware automatically as by the structure disclosed in my copending application Serial No. 215,615, filed Aug. 26, 1927, which has become Patent 1,751,049, this turning structure may be mounted at any convenient point on the drier so as to operate on the ware preferably prior to being subjected to the handle or other figure applying operation with which the present invention is concerned, and to enable the ware to be removed from and/or replaced in the drier along various portions of the latter, cover plates 9 may be provided as illustrated in Fig. 1.

In the application of the invention as illustrated in Figs. 1, 1ª and 1ᵇ and 2, a supplemental treating or drying compartment 5ª is adjustably mounted on the main drier 5 as by angle braces 5ᵇ and screw bolts 5ᶜ, so that this compartment 5ª may be shifted along the drier and secured in any desired position as will prove most advantageous. This supplemental treating or drying compartment 5ª is provided with a conveyor 6ᵇ which may be substantially similar to the lower conveyor 6, and it is preferred to drive these conveyors 6 and 6ᵇ in synchronism, and with this end in view, a Geneva gear 10 is shown as adjustably secured on a shaft 7ᵇ and which also serves the function of one of the shafts 7ª, said Geneva gear being intermittently actuated by a motion plate or cam 11, also adjustably secured as in Fig. 4 on a counter shaft 12. It is preferred to mount the gear 10 and cam 11 in a manner as indicated in Fig. 4 and which will subsequently be described, to provide for adjustment while in operation and while the driving connection subsists.

In order to save power that would otherwise be required in accelerating and retarding a comparatively large and ofttimes heavy conveyor, it is preferred to drive the conveyor as a whole continuously while at the same time halting sections thereof to perform a desired operation relatively to the ware in or on the molds without halting the complete conveyor, and this method of driving a conveyor may be more readily understood by referring to my copending application Serial No. 202,629, heretofore noted. To adapt the present conveyor to this form of drive, the motion plate shaft 12 is connected with one of the lower shafts 7ª as by a flexible member or sprocket chain 13, and as the motion plate is preferably continuously driven, the shaft and sprocket connected thereto will also be continuously driven. Then if it should be desired to temporarily halt the trays in a portion or section of the conveyor without halting the complete conveyor, a motion-transmitting or section-isolating sprocket 14, illustrated at the lower portion of Fig. 1, may be interposed between the driven sprocket and its adjacent sprocket or sprockets, and the intermittently driven Geneva gear shaft connected with the shaft 7ª having thereon the sprocket which controls that portion of the conveyor moving between these connected sprockets, this connection or flexible member or chain being indicated at 15. The sections of the conveyor chain which are passed over the sprockets primarily driven from the shaft on which the Geneva gear is secured are preferably provided with a predetermined degree of slack, and when the said Geneva gear stops, the links on one side of these sprockets will gradually collapse as the slack accumulates, while on the other side of said sprockets the links will gradually straighten as the slack is distributed or dissipated, and during all or part of this time the trays remain inert as will be understood by referring to my copending application above noted.

In the structure illustrated in Figs. 1, 1ª and 1ᵇ and 2, the freshly formed ware is moving into the drier at the right of the lower portion of Fig. 1 and conveyed through the drier to the left side thereof, the conveyor preferably being shifted the distance of two trays and the ware in the molds of each alternate tray transferred from the lower to the upper or supplemental treating compartment or drier and deposited on the handle molds, conveyed therethrough until the handle sets, and then removed from the supplemental drier and boxed or disposed in end-abutting relation or on top of the ware in the forming molds, indicated at C, of each alternate tray in lower drier.

First considering the structure which is preferably adapted for applying the casting slip to the molds or forms provided for this purpose and transferring the ware from the lower drier to these molds or forms in the upper drier and which structure is shown in enlarged sectional side elevation in Fig. 1ª, the numeral 16 generally designates a main stationary supporting frame which is preferably secured to the side wall of the compartment 5ª as by screw bolts 16ª, this main frame including a platform or cross brace structure 16ᵇ, see Fig. 5, not visible in side view, to which guide members or posts 17 are preferably adjustably secured as by nuts 17ª, the upper extremities of said posts being threaded and extending through enlarged openings in said cross brace structure to provide for this adjustable securement. These guide posts 17 are adapted to guide and support a supplemental frame unit, generally indicated at 18, the lower ends of said posts being formed with stop heads 19 which in some instances support the frame 18 when in its lowermost position and act as a stop for said frame. The lower portion of the frame 18 is formed with a transverse dove-tail groove, indicated in dotted lines at 20, a bar 21 being mounted to slide horizontally in said groove, said bar being formed with a bracket portion at one extremity for insertion of an adjusting screw 22. A lever 23 is pivoted at its lower extremity to the bar 21 and at its upper extremity adjustably pivoted as at 24 to the supplemental frame 18, adjustment of this pivotal connection being permitted while in operation and while the driving connection subsists preferably through the medium of the sliding block structure illustrated in detail in Figs. 3 and 3ª.

This adjustment assembly preferably comprises a pivot or journal block 24ª, which is journaled in a longitudinally slotted portion of the lever or member to be pivoted or fulcrumed, indicated at L, and bored and threaded for insertion of an adjusting and retaining screw 24ᵇ, said block 24ª being also mounted to shift or slide through adjustment of screw 24ᵇ in a longitudinally slotted portion of a block or analogous member 24ᶜ, the journal or bearing portion of block 24ª being headed and the side walls of the longitudinally slotted portion of the lever L formed with a retaining track or groove for said head. Block 24ᶜ is adjustably secured to the frame or casting 5 of the assembly as by screw bolts 24ᵈ and 24ᵉ and positioning pin 24ᶠ, the frame or casting being arcuately slotted as at 24ᵍ where the bolt 24ᵉ extends therethrough and a plurality of positioning holes 24ʰ provided in the frame for pin 24ᶠ. By loosening bolts 24ᵈ and 24ᵉ, pin 24ᶠ may be adjusted in any of said holes to definitely locate or spot the angular position of block 24ᶜ relatively to the frame of the assembly and lever L, while screw bolt 24ᵉ may be adjusted in slot 24ᵍ to accomplish the same result independent of pin 24ᶠ and intermediate of holes 24ʰ. Adjusting screw 24ᵇ is journaled in said block 24ᶜ and provided with thrust or bearing collars or set nuts 24ⁱ and adjusting crank or handle 24ʲ. It will be seen that by turning screw 24ᵇ, journal block 24ª may be shifted in the guideway provided therefor and thus shift the pivotal or fulcrum point of lever L and vary the throw of said lever or the extent of reciprocation thereof from a stationary point and while in operation and while the driving connection subsists. By adjusting the angle of block 24ᶜ and/or shifting the block 24ª, various advantageous results may be obtained. For instance, the extent of reciprocation of lever L may be varied without varying the lowermost point of reciprocation, or the extent of reciprocation may be varied without varying the uppermost point of reciprocation, or the intermediate point of reciprocation may be maintained constant while at the same time varying the extent of reciprocation, or the lowermost point of reciprocation may be varied to a greater or less extent than the uppermost point of reciprocation and vice versa, or the altitude of reciprocation varied.

The foregoing assembly as a whole may in turn be adjustably supported by a turn-buckle or analogous member 24ᵏ, which may also be adjusted to raise and lower the pivotal or fulcrum point of level L, and to provide for both vertical and lateral adjustment independent of the turn-buckle, the assembly frame is formed with a slot 24ˡ and the bracket or other member to which said frame is to be secured is formed with slots 24ᵐ at right angles to slots 24ˡ. Securing or fastening bolts 24ⁿ are passed through these slots and secured. By loosening said bolts 24ⁿ, the assembly as a whole may be adjusted both vertically and laterally.

This method of adjustably supporting the assembly is preferably adopted wherever practicable. However in some instances this adjustable mounting is illustrated in modified form to conserve space, but it will be understood that in practice, it is preferred to adopt the structure substantially as above described.

Wherever a lever or analogous part is described as being adjustably pivoted or fulcrumed "as in Figs. 3 and 3ª" it is meant that the lever under consideration is preferably mounted as above described.

Reverting to Fig. 1ª, the upper transverse portion of the supplemental slidable frame 18 is formed with a further dove-tail groove, also indicated in dotted lines, for slidably supporting a bar 25 in a horizontal plane, said bar terminating at the left as viewed in Fig. 1ª a suitable distance from the end of the said groove provided therefor, thus providing a seat for a suitable compression spring 26, adjustable through the medium of a screw 27, the bar 25 being adjustably maintained under longitudinal pressure by said screw and spring. A suitable cam-contacting member or bracket 28 is secured to the bar 25, and to connect the bracket 28 and lever 23 in readily adjustable association, a turnbuckle 29 is pivotally secured to said bracket and lever, a plurality of securing holes being provided in the bracket 28 and lever 23, so that the turn-buckle may be adjustably mounted thereon and adjusted at varying elevations to adjust the throw of the lever 23.

Pivotally mounted on the lower laterally sliding bar 21 is a chuck or grip-head stem or analogous member 30 carrying a ware pick-up member or chuck or grip head 31, a number of different forms of which are shown in section in Figs. 7ª, 9 and 14. To gain a clear understanding of the construction of these ware transfer chucks, reference is made to my copending application Serial No. 203,186, above noted. Briefly, the grip head shown for example in Fig. 14 comprises a body member 31ª of any suitable material having formed therein a longitudinal bore 31ᵇ with diverging branches 31ᶜ and 31ᵈ. In this instance the chuck is adapted for the application thereto of super and/or sub atmosphere through the bore 31ᵇ, which is shown as branching off at right angles and leading to the exterior of the chuck and having a nipple connected thereto for application of a suitable hose or other flexible tubing 32ᶜ, the latter leading to a valve generally indicated at 32 and an example of which is illustrated in detail in Fig. 23, said valve being adapted to be supported from the frame 16 or any other convenient structure as by the threaded stem or bolt 32ª and securing and set nuts 32ᵇ. Any desired number of these valves may be employed and serve to regulate and control the application of super and/or sub-atmosphere to the points where required. By referring to Fig. 23 it will be noted that the valve 32 has attached thereto three flexible connecting members, as at 32ᶜ, 32ᵈ and 32ᵉ, the member 32ᶜ leading to the grip head or chuck as just specified, the member 32ᵈ leading to a source of application of air under pressure or super atmosphere or may lead simply to the atmosphere, and the member 32ᵉ leading to a source of sub-atmosphere or suction or vacuum pump. The valve 32 is also provided with a plunger 33, formed with ports 32ᶠ and 32ᵍ. It is preferred to actuate plunger 33 as particularly illustrated in Fig. 23ª, to provide for selective regulation of the dwell or length of time of application of super and/or sub-atmospheric pressure, and with this end in view, cams 33ª, 33ᵇ, 33ᶜ and 33ᵈ are independently and adjustably secured on shaft 34 preferably as in Figs. 4ª and 4ᵇ and which structure will be hereinafter described. The plunger 33 is extended to provide a supporting bracket for cam-contact members or pins 33ᵉ and 33ᶠ, shown projecting at right angles from said plunger. Ordinarly frictional contact serves to maintain the plunger in shifted position, but to balance the weight of said plunger and ensure its remaining in shifted position, a spring 33ᵍ is attached at opposite extremities respectively to the lower portion of the bracket provided by the plunger and the valve casing. As each cam is so mounted as to permit adjustment thereof while in operation as will presently be described, the plunger 33 may be given varying dwell periods, to thus vary the dwell of application of super and/or sub-atmospheric pressure and which is of material advantage in the operation of the apparatus.

The shaft 34 is supported by and has bearing in opposite sides of the main frame 16 and may be of such transverse extent as to accommodate any number of supplemental frame units and cooperating structures, as will be apparent from Fig. 2. To impart lateral sliding movement to the bars 21 and 25, a cam 35 is adjustably secured as in Fig. 4 or 4ª and 4ᵇ on the shaft 34, said cam being adapted to contact with the bracket 28 secured on the upper bar and which is under spring tension as heretofore specified, and to impart vertical movement to the supplemental frame 18 and consequently to the bar 21 and devices attached thereto, a further cam 36 is adjustably secured as in Fig. 4 or Figs. 4ª—4ᵇ on the shaft 34, said cam being adapted to contact with a roller 37ª rotatably mounted on a lever 37, said lever being adjustably pivoted at one extremity as at 37ᵇ through the medium of the sliding block structure heretofore specified to a stationary bracket 38, which is secured to the platform or cross brace structure 16ª as at 38ª, and at its opposite extremity said lever 37 is pivotally and adjustably connected to the frame 18 through the medium of a bracket bolt 39 passed through a lug or ear 40 forming part of the said frame 18, securing and adjusting nuts 39ª being threaded on said bolt 39 on opposite sides of said lug 40. A stud 41 is adjustably secured in the lower portion of the frame 18, said stud being adapted to contact with a cam or tapered portion of the chuck stem 30 above the pivot point of the latter, so that when the bar 21 slides laterally to the right in frame 18, the chuck or grip head will first swing upwardly in an arc and then move more or less horizontally, depending upon the shape of the cam portion of the stem, and on the reverse sliding movement of said bar 21, said head will again travel more or less horizontally and lower in an arc back to its original position. An adjusting and limiting screw 21$^a$ is mounted in a suitable bracket on the bar 21, said screw being adapted to contact with the stem 30 and definitely spot and limit the movement of the chuck 31 when swinging back to vertical position.

The cam-adjustment and mounting structure illustrated in Figs. 4 and 4$^a$ and 4$^b$ is preferably adopted with a view to permitting change in the phase of motion of the parts primarily actuated by the cams to which said structure may be applied while said parts are in operation and while the driving connection subsists. To illustrate, the cam is shown applied to a shaft S which is formed with an annular threaded groove 34$^a$, see Fig. 3, and the hub 34$^b$ of the cam is formed with a bracket portion 34$^c$, which is bored to form a bearing housing for an adjusting and set screw 34$^d$, the latter being formed with or having secured thereon a gear or gear head 34$^e$, the one extremity of the screw housing or bore being enlarged to receive said gear and internally threaded to receive an externally threaded retaining plug or nut 34$^f$. The hub and cam are provided with a guide bore or slot extending at right angles to the screw 34$^d$, said bore or slot being adapted to receive a rack 34$^g$, in mesh with gear 34$^e$, said ratchet being suitably secured at one extremity to a collar 34$^h$ provided with an annular groove 34$^i$, the collar 34$^h$ having a sliding fit on shaft S. An adjusting screw 34$^j$ may be mounted in a suitable stationary supporting bracket or supported from any other adjacent stationary part of the frame of the machine, the one extremity of said screw being provided with a lug or analogous member 34$^k$, adapted to ride in the groove 34$^i$ of collar 34$^h$. The threads of groove 34$^a$ and screw 34$^d$ are preferably of the irreversible or single-thread type, to prevent angular displacement of the cam due to work imposed thereon. It will be readily understood that by adjusting screw 34$^j$, the ratchet 34$^g$ in mesh with gear 34$^e$ will cause screw 34$^d$ to turn and thereby change or adjust the angular position of the cam relatively to shaft S.

Figs. 4$^a$ and 4$^b$ show a slight modification in structure to adapt the phase-changing adjustment to a smaller space, or where it may not be found practicable to install the structure illustrated in Fig. 4. In this instance the screw 34$^d$ is inserted in the cam instead of the hub thereof, the cam being formed with a bore for this purpose, said bore terminating in an enlarged slot or recess 34$^l$. The gear 34$^e$ in this instance is provided with teeth or pins which project radially beyond the side walls of the cam. In assembling, the screw 34$^d$ may be inserted in the bore and the gear 34$^e$ in the slot 34$^l$ and the said bolt threaded into said gear and secured as by a countersunk screw 34$^m$. An adjusting segment 34$^n$, more clearly shown in Fig. 23$^a$, formed on one extremity of an adjusting rocking lever 34$^o$ is used as a contact member for adjusting purposes, the lever as herein shown being mounted on a bracket shaft 34$^p$ formed with a longitudinal groove 34$^q$, a screw 34$^r$ being threaded through the lever 34$^o$ and projecting into said groove, said lever 34$^o$ being thus limited in its rocking movement by the screw 34$^r$ contacting with the side walls of groove 34$^q$. The handle portion of the lever 34$^o$ is preferably of heavier construction than the segmental portion, so as to normally maintain the segment out of range of the projections on the gear 34$^e$ or the radial path of said gear. To adjust the cam, the lever may simply be rocked inwardly to bring the segment within the radius of the pins or projections on gear 34$^e$ as the cam rotates on the shaft S, this adjustment being reversed by sliding the lever 34$^o$ along its supporting shaft 34$^p$ and engaging the gear 34$^e$ on the opposite side of the cam.

Wherever a cam or analogous motion-transmitting member is described as being adjustably secured "as in Figs. 4 or 4$^a$ and 4$^b$" it is meant that the cam or analogous member under consideration is preferably mounted as above described.

By referring to my copending application Serial No. 203,186 above specified the operation of the ware pick-up and transfer assembly just described may be readily understood and from which it will be apparent that the transfer chuck may be spotted relatively to the ware in or on the molds while the machine is in operation and caused to move in a predetermined path between a point of pick-up and a point of deposit.

A charger or charge-applying and measuring device generally indicated at 42 and preferably of the form illustrated in Figs. 1$^a$ and 19 is supported from the main stationary frame as by a supporting bracket 43 and screw bolts 43$^a$, the lower extremity of said bracket being adapted to support an externally threaded sleeve 44 by means of upper and lower adjusting and securing nuts 45, said sleeve being threaded into the charger casing 42$^a$ which is internally threaded at the upper portion thereof, said casing preferably being provided with valve-controlled ports 46, 47 and 48, the port 46 having connected thereto a suitable conduit member or hose 46$^a$ leading to a source of supply such as the tank T, Fig. 19, of clay slip or clay of the desired plastic state, the port 47 having connected thereto a similar conduit member or hose 47$^a$ which in Figs. 1 and 1$^a$ leads to the handle or figure casting and applying mold hereinafter described, and the port 48 being provided with a conduit member 48ª which may lead to a place of deposit of excess slip and/or any slip or clay that may leak past the plunger of the charger. In Fig. 19 the hose 48ª is shown leading to the upper portion of the tank T, to indicate that the excess slip may be returned to the source of supply. A further port 49 may be formed in the casing, and this port may have a flexible conduit member 49ª attached thereto leading to a nozzle member which will hereinafter be described or said port may remain closed, as will presently be apparent. The ports 46, 47 and 48 are preferably controlled by check valves which may be of the ball and spring type shown. A plunger or piston 50 having a stem 50ª slidably mounted in the sleeve 44 is provided, said stem preferably extending upwardly through openings in the bracket and frame 16 of the machine and which may serve in some instances to steady the plunger stem while in operation. The piston head may be provided with the usual packing to prevent leakage, and the sleeve 44 may also be provided with packing or a gland for packing to prevent leakage past the stem of the piston. A plug 49ᵇ is inserted in the casing a suitable distance below the port 49, to provide for interchangeability of the position of said port.

To actuate the plunger or piston 50, a lever 51 is adjustably fulcrumed at one extremity as at 51ª in a screw bracket 52 extending through a lug or ear 52ª and adjustably secured as by adjusting and securing nuts 52ᵇ, the fulcrum point of said lever being shiftable while in operation and while the driving connection subsists as in Figs. 3 and 3ª, to thereby vary the throw of said lever and measure the stroke of said plunger while the mechanism is in operation. A cam 53 is adjustably secured on the shaft 34 as in Fig. 4, said cam being adapted to contact with a roller 54, rotatably mounted on the lever 51, the said lever extending across and being formed with a forked extremity 51ᵇ, see Fig. 2, which serves as a pivot yoke for pivotally connecting said bar to a pivot block 55, adjustably secured on the plunger stem 50ª as by adjusting and securing screws 55ª, and to maintain the cam roller 54 of lever 51 in contact with the cam 53 and also to apply regulable pressure and variable travel to the piston 50, a compression spring 56 is applied over the stem 50ª and adjustably maintained in position as by a collar 56ª and screw 56ᵇ, said spring being compressed between the upper part of the bracket 43 and said collar upon the upward stroke of the piston 50. To adjust the lowermost point of reciprocation of the piston 50 without varying the uppermost point of reciprocation thereof, a collar 57 is adjustably secured as by screw 57ª on the upper extremity of the stem 50ª and adjustable relatively to the frame 16.

In some instances it may not be desired to feed the same quantity of slip or clay to each consecutive mold, as for instance, a greater charge may be required for one article of ware than another, and to provide for this contingency, a reduction gear such as a Geneva wheel or gear 53ᵇ, see Fig. 19, is secured on a counter or stub shaft 53ᶜ mounted adjacent cam 53, and a motion plate 53ᵈ is adjustably secured as in Fig. 4 or 4ª and 4ᵇ on the shaft 34 and adapted to intermittently actuate the Geneva gear 53ᵇ. Charge-measuring members shown in the form of adjustable contact screws 53ᶠ are adjustably secured in spaced relation around the periphery of a disk or wheel 53ᵍ and which may form part of the Geneva gear 53ᵇ, these members 53ᶠ preferably corresponding in number to the slots in the Geneva gear which in the present instance are shown as four in number for the purposes of illustration. A further contact member or screw 53ʰ is adjustably secured in a bracket 53ⁱ on the lever 51, said screw 53ʰ being adapted to contact with the screws 53ᶠ at each intermittent partial revolution of the Geneva gear 53ᵇ. By adjusting contact members 53ᶠ at varying distances relatively to the screw or member 53ʰ, the stroke of the charger plunger 50 may be correspondingly varied independent of the cam 53, and by adjusting contact screw 53ʰ independent of screws 53ᶠ, the complete cycle of strokes may be varied without varying each individual stroke. Also, the motion plate and/or Geneva gear may be disconnected and the screw 53ʰ adjusted relatively to any of screws 53ᶠ, to limit the lowermost stroke of plunger 50 independently of the cam 53 or collar 57.

The reference numeral 58 generally designates a tray-spotting and stabilizing member, a number of which are provided throughout the apparatus, said members as herein shown being floatingly mounted on and supported by a headed post 58ª, bolted or otherwise secured to the supplemental vertically slidable frame 18, the spotting member 58 being applied over the head of said post and a retaining ring 58ᵇ then secured thereon as by screws or similar fastenings, and to prevent angular or rotative movement of the member 58 on said post, the latter may be squared or a spline provided therein, as at 58ᶜ. The lower extremity of the post 58ª is bored longitudinally to provide a seat for a spring 58ᵈ, which may be inserted prior to mounting the member 58, said spring functioning to apply additional resilient pressure and ensure operation of said member. The upper portion of the post is formed in two sections and connected by an adjusting coupling 58ᵉ, thus providing vertical adjustment independent of the frame 18. The tray-contacting portion of the member 58 may be given any desired shape as will best adapt said member to serve its function and in accordance with the size and shape of the tray.

Figs. 11 and 12 illustrate one type of handle-applying or casting form or mold which, for the purposes of illustration, is shown in connection with the apparatus of Figs. 1ª and 1ᵇ, generally indicated at A, this form or mold being disposed on a particular type of tray, a preferred construction of which is illustrated in detail in Fig. 10 and generally indicated at B. The mold comprises a two-part body member, said parts being indicated at 59 and 59ª and adapted to separate at the joint indicated at 59ᵇ, these parts being slidable on a piston 60 and supported by and having a limited sliding movement in a frame 61 provided with a detachable cover 61ª formed with a ware-positioning seat or cavity and which is preferably faced with felt or some similar substance, to compensate for shrinkage and prevent marring of the ware when deposited therein. The bottom portion of the frame 61 is formed with a chuck-contacting projection 61ᵇ which is shaped to center the mold on the chucks and adapted to seat in a recessed portion of the tray B. A retracting spring 62 is inserted in the piston 60 and adjustably secured at opposite ends to the partible body members 59 and 59ª, as at 62ª, and at an intermediate point said body members are respectively recessed or cut away to provide a seat for a steadying and guide member or block 63, see Fig. 11ª, which serves to spot or position the meeting point or joint of the body members when closed or in contact, said member 63 being formed with an internally threaded opening and the piston 60 with an intermediate externally threaded portion, as at 63ª, so that in assembling the guide block 63 may be adjustably threaded on said piston. The piston 60 is formed with ports at an intermediate point, as at 60ª, and the guide block 63 is longitudinally bored, as at 60ᵇ, said bore registering with a bore in the frame 61 having a suitable flexible conduit member 60ᶜ connected thereto. The piston 60 is prevented from angular displacement by a screw 63ᵇ, and a further screw 63ᶜ serves to secure the guide block 63 to the frame 61. The mold assembly so far described may be formed of any suitable material, preferably non-corrosive, and in between the separable members 59 and 59ª, or in the abutting surface portions thereof, said members are cut away or recessed to provide a retaining recess for a supplemental mold a, preferably of absorbent material such as plaster, and which in the present instance is shaped for a handle, said retaining recess being of any suitable size and preferably dove-tailed, to retain the sections of the absorbent mold a in place and facilitate removal and replacement. These molds a may be cast to any desired interior shape or figure and for the usual size of handle or decorative figure, may be standardized as regards their exterior shape or outer surface contour. Provision is made for introducing sub or super-atmosphere to the mold a, in the form of passages 64 and 65, regulable or adjustably controlled as by screw plugs 64ª and 65ª, the passages 64 opening out over an extended surface area to provide chambers 64ᵇ and the passages 65 terminating in the absorbent mold a and communicating with the clay-contacting surface thereof preferably through grooves or vents 65ᵇ, the said passages 65 and vents 65ᵇ in the form of mold illustrated in Figs. 11 and 12 being formed by grooving the abutting surface portions of the mold a, the passages 65 communicating with one of the ports 60ª through a bore formed in the guide block 63. To spot or angularly position the mold A on the tray, the frame 61 is formed with a hole or bore and a pin 66 adjustably threaded or otherwise secured in the tray B, said pin being adapted to register with the hole or bore when the mold is lowered onto the tray and thus center and position the mold on said tray. The bottom chuck-contacting projection 61ᵇ is formed with openings or cut-out portions 66ª, so that any chips or clay particles which might otherwise have a tendency to accumulate between the mold sections may be discharged or fall through the bottom of the mold.

Fig. 15 illustrates the mold A adapted for a plurality of pieces of ware, this slight modification being obvious from the drawings.

Figs. 16 and 17 illustrate the mold A formed in one piece and adapted for a decorative figure or design. The operation of joining the design to the ware is substantially similar to the handle-applying operation.

Fig. 10 illustrates a number of molds A disposed in position on a tray B, the latter preferably being swingably mounted in the conveyor chains 6ᵇ through the medium of projecting trunnions b, which may be formed as part of the tray, the said trunnions being longitudinally bored, as at 67. Attached to the wall of the drier or on any other suitable support or part of the frame of the machine along the line of travel of the trays B and adjacent the points of transfer or removal and other operations where it is desired to apply super and/or sub-atmosphere to the molds A, a tray-registering device or assembly generally indicated at 68 is illustrated, said assembly preferably comprising a housing or frame 68ª, bolted or otherwise suitably secured to the wall of the drier in the present instance, a spring 68ᵇ adapted to seat in the housing, a longitudinally bored spotting member or piston 68ᶜ having a flush sliding fit in the said housing against the resistance of said spring, and an adjusting washer or annular ring 68ᵈ provided with ports 68ᵉ and which also serve as sockets for a spanner or analogous adjusting wrench, said ring being externally threaded and the housing interiorly threaded to receive said ring. The resiliently mounted spotting member or piston 68$^c$ is formed with a radially enlarged convex disk-like head and the trunnion $b$ with a concave or dished end, thus providing in effect male and female members which are adapted to register at the proper point along the line of travel of the trays. A threaded nipple 68$^f$ is inserted in the housing 68$^a$, for attachment thereto of one of the hose connections 32$^c$ of one of the valves 32. Suitable tubing 70, which may if desired be flexible, is disposed in the tray B and connects with the molds A through the conduits 60$^c$ and also with the bore through the trunnion $b$ of said tray, valves 70$^a$ being provided at proper points in said tubing so that the application of super and/or sub-atmosphere to the molds A may be selectively controlled.

A cooperating tray-registering device 71 is mounted to register with the trunnion $b$ on the opposite side of the tray relatively to the device 68 and which serves to brace and hold the tray in position or prevent lateral play during application of super and/or sub-atmosphere through the device 68, said device 71 being adjustably threaded in a supporting bracket 71$^a$, which may be bolted or otherwise secured to the wall of the drier or adjacent stationary part of the frame of the machine. Super and/or sub-atmosphere may also be admitted to the device 71 and through the latter to the molds A, a nipple 71$^b$ being attached to said device, which is longitudinally bored and registers with the bore of the trunnion $b$ in a manner substantially similar to the device 68, said nipple being adapted for a hose connection leading to one of the valves 32.

It will be obvious that instead of providing the trays with projecting trunnions, similar projections could be provided in the conveyor to serve the same purpose.

Reverting now to Fig. 1$^a$, the lower laterally sliding bar 21 has suitably secured thereto a bracket 72, which serves to support a slip-applying nozzle member generally indicated at 73, the nozzle illustrated in section in Figs. 1$^a$ and 24 being a preferred construction adapted for use with the charger 42 and comprises an externally threaded valve casing 73$^a$, formed with a valve chamber 73$^b$, the inlet port of which is preferably normally closed by a ball and spring valve, to prevent reverse flow of slip in some instances as in the syphoning system hereinafter described and also to prevent drip in its present application, said casing 73$^a$ being threaded into an interiorly and exteriorly threaded adjusting shell or casing 73$^c$, the threads of both the inner and outer casing preferably being of the same pitch, the outer casing in turn being adjustably threaded into a mold-contacting member 73$^d$, preferably so shaped on its lower mold-contacting portion as to approximately fit in or on the surface of the mold A, or frame of the latter, adjacent the filling opening of the mold $a$. The casings 73$^a$, 73$^c$ and member 73$^d$ are preferably formed with registering openings, the lower opening forming an outer nozzle which surrounds a charging nozzle 73$^e$ and which is adjustably threaded into the opening of the inner casing 73$^a$, to provide an outlet for the chamber 73$^b$, and the inlet 73$^f$ to said chamber may have connected thereto the outlet conduit or hose 47$^a$ from the charger 42. An excess-material-receiving chamber, as at 73$^g$, is formed between the casings 73$^a$ and 73$^c$, the said chamber communicating through a bore 73$^h$ and tube 73$^i$ with a valve 74, see Fig. 1$^a$, the inlet to which is preferably normally closed by a ball and spring valve 74$^a$ and the outlet thereof provided with a nipple 74$^b$ for attachment of the conduit member or hose 49$^a$, for a purpose which will hereinafter be apparent. The nozzle 73 is floatingly and adjustably supported as a unit from an adjustable branch bracket 72$^a$, adjustable horizontally as by coupling or sleeve 72$^b$ and vertically by screw 72$^c$, a supporting bolt 72$^d$ having retaining and limiting nuts 72$^e$ and 72$^f$ being passed through the one extremity of the branch bracket 72$^a$ and formed with an enlarged head mounted in an annular recess in the upper extremity of the casing 73$^a$ and retained in place by a retaining ring 72$^g$. To prevent angular movement of the valve assembly 73, a pin 72$^h$ is passed through the branch bracket 72$^a$ and projects a suitable distance into a bore in the casing 73$^a$. It will be seen that when an impulse is given the charger plunger, slip or clay in the desired plastic state will be forced up through the conduit 47$^a$, into the valve chamber 73$^b$ and from the latter through the inner nozzle 73$^e$ into the mold $a$. By adjusting the casing 73$^a$ in the shell 73$^c$, the inner nozzle may be lowered or elevated without affecting the position of the surrounding or guide nozzle, and by adjusting the shell 73$^c$ on the casing 73$^a$ and in the member 73$^d$, the outer guide nozzle may be lowered or elevated without affecting the position of the inner nozzle, and by adjusting the casings 73$^a$ and 73$^c$ as a unit in the member 73$^d$, both of said nozzles may be adjusted without changing their relative positions. These adjustments are of particular advantage in applying the slip to the casting molds.

The reference numeral 75 designates a treating member or head shown in the present instance attached to an adjustable extension or branch bracket 75$^a$ adjustably secured to bracket 72, a hose being illustrated as leading thereto for introduction of a suitable treating fluid or gaseous medium such as super and/or sub-atmosphere. In the position shown in Fig. 1ᵃ this member may serve to clean and dry the molds prior to charging, as by subjecting said molds to a blast of air. However, this member 75 may be mounted interchangeably relatively to nozzle 73, or the latter mounted at a suitable point along the bracket 75ᵃ, which is shown threaded at one extremity to permit application of extensions, so that the molds may be charged through said nozzle prior to being subjected to treatment by said member, as where it is desired to permit the handle, figure or other appendage to set prior to application or joining to the ware and then moisten the joining surface as commonly practiced, or this member 75 may be used as described in connection with Fig. 18 for extracting the core of the spout or other appendage after the latter has set to the desired state and prior to uniting with the article of ware.

Additional tray-spotting and stabilizing members 76 and 77, which may be constructed substantially similar to the member 58 heretofore described, are shown as adjustably supported from the bracket 72, these spotting and stabilizing members functioning to spot and maintain in stable condition the trays B during the operations of charging the molds and subsequent disposing of the ware in position on said molds.

Fig. 1ᵇ illustrates a form of apparatus that may be used in transferring the ware from the handle or figure-applying molds A on the trays B in the treating chamber 5ᵃ to the forming molds indicated at C, each cup or article of ware with the handle applied thereto being disposed in brim or edge-abutting relation to a formed cup in the trays 8 of the lower drier, or in other words the ware is boxed. These forming molds C are the molds in which the ware is jiggered or cast and may be replaced by forms or other ware-carrying structures if desired. The supplemental sliding frame structure 18 and cooperating parts are substantially similar to the corresponding structure illustrated in Fig. 1ᵃ and like reference numerals are applied thereto. The cams for imparting the desired vertical movement to the frame 18 and horizontal movement to the slide bars 21 and 25 are designated by the reference numerals 78 and 79 and are preferably adjustably mounted as in Figs. 4 or 4ᵃ and 4ᵇ on a shaft 80, see Fig. 2, and said shaft 80 is preferably connected to the motion plate shaft 12 through the medium of suitable sprockets or pulleys and a flexible chain or analogous positive connecting member as at 81 and driven in synchronism therewith.

It is preferred to elevate the molds from the trays and definitely center or spot same when an operation is to be performed thereon, as when being transferred from the supplemental driving or treating chamber 5ᵃ to the lower drier, and with this end in view a chuck member 82, preferably shaped so that the bottom or under portion of the mold will center itself thereon when the chuck rises and engages the mold, is shown as adjustably secured by screws 82ᵃ on a supporting bar or cross head 83, slidably mounted at opposite sides of the machine in dovetail grooves formed in brackets 84, shown dotted in side elevation in Fig. 1ᵇ, and depressible against the tension of springs 85, which are mounted in the recesses provided by said grooves where the latter terminate at the lower extremities of said brackets. Levers 86 are pivotally connected at one extremity through the medium of links 86ᵃ to the cross head 83 and at their opposite extremities said levers are pivotally mounted through the medium of the structure shown in Figs. 3 and 3ᵃ as at 86ᵇ on screw brackets 87, which in turn are adjustably secured on a stationary part of the frame, as at 87ᵃ. Cams 88 are adjustably secured as in Figs. 4 or 4ᵃ and 4ᵇ on the shaft 12, said cams being adapted to contact with rollers 89, rotatably mounted on said levers 86 and depress the cross head 83, carrying the mold elevating and spotting chucks, against the tension of springs 85. The pivotal point 86ᵇ of lever 86 being adjustable while in operation and while the driving connection subsists thereby provides for varying the throw of said levers 86 while in operation and consequently the reciprocation imparted to the chucks 82.

A further tray spotting and stabilizing member 90, which may be of substantially the same construction as the analogous member 58 heretofore described, is mounted on the lower horizontal sliding bar 21 in Fig. 1ᵇ through the medium of adjustable brackets 90ᵃ 90ᵇ, to accurately position and hold the trays steady during removal of the ware from the molds carried by said trays.

In the foregoing and subsequent description, it will be noted that parts are ofttimes referred to in the plural where only one of said parts shows in the drawings, this being due to the fact that the drawings only illustrate in many instances a single unit where it is contemplated in actual practice to embody a multiple of units.

As heretofore specified, in the form of the invention so far described, it is preferred to apply handles to the ware in the molds of each alternate tray and then box the handled ware on the ware in the forming molds C, and in Fig. 1ᵇ the ware chuck or grip head is shown in full line position depositing a cup with the handle applied thereto on top of a cup in the forming molds C carried by the trays of the lower drier, the dotted line position of said chuck 31 and stem 30 being shown simply to illustrate the alternate position thereof. In boxing the ware, it is preferred to elevate the molds C from the trays of the lower drier, and one method of accomplishing this result is to adjustably secure chuck spindles 91 as by nuts 91ᵃ on a cross head 92 and which may be compared with the cross head 83 above described and is preferably slidably mounted in a similar manner at opposite extremities in the grooved portion of uprights or brackets 93, see Fig. 2. Levers 94 are adjustably pivoted or fulcrumed at 94ᵃ as in Figs. 3 and 3ᵃ to screw brackets 95, adjustably secured to a stationary part of the frame of the apparatus as by nuts 95ᵃ, and at their opposite extremities said levers are pivoted to the upper ends of connecting links or rods 96, the lower ends of said links or rods extending down and being pivotally secured to the opposite extremities of the cross head 92 as at 96ᵃ, see Fig. 2. To actuate the levers 94, cams 97 are adjustably secured as in Figs. 4 or 4ᵃ and 4ᵇ on the shaft 12, said cams being adapted to contact with rollers 97ᵇ rotatably mounted on said levers. As the throw of the levers 94 may be varied while in operation and while the driving connection subsists, the reciprocation of chucks 91 may be adjusted without stopping the machine.

In boxing ware it is customary to moisten the brims or edges of the cups or other articles prior to placing same in abutting relation, and if it should prove desirable to adopt this procedure in the present method, the moistening device shown in transverse section in Fig. 1ᵇ may be used, said device preferably comprising a suitable container 98, adjustably secured to the wall of the chamber 5ᵃ as by brackets 98ᵃ and securing bolts 98ᵇ extending through enlarged openings; the container having therein suitable liquid-absorbing material such as sponge or a wick adapted to be fed through a tube 98ᶜ leading to a source of supply and which may be regulated by means of one of the valves 32 or a charging and measuring device such as 42 or otherwise, the sponge or wick projecting slightly above the top of the container 98 into the path of travel of the ware carried by the chuck 31. The grip head or chuck used in transferring the ware in Fig. 1ᵇ is preferably of the bottom grip type, an example of which is illustrated in Fig. 9.

For the purposes of illustration, the apparatus is shown in Fig. 2 as being primarily driven from the cam shaft 34 through gear 99 and pinion 99ᵃ, the latter being secured on the drive shaft of a motor or other power member such as a line shaft, not shown, the shafts 34 and 80 being connected as by a sprocket chain or other suitable flexible member 100. As will be obvious, the shafts 34 and 80 may be of such length as will accommodate the number of units employed.

To facilitate an understanding of the form of the invention illustrated in Figs. 1 to 2, inclusive, a brief description of one cycle of operations that may be carried out by the apparatus is stated as follows:

Assuming that the formed ware is moving into the lower drier at the lower right-hand portion thereof in the molds C carried by the trays 8. The ware is conveyed through the drier without interruption until it reaches the point at the left where the conveyor is shown in slack condition, and at this point the Geneva drive is timed so that the trays will be temporarily halted, each alternate tray being halted when it reaches a point above the sprocket shaft. However, the trays may be halted on either side of said sprockets or at any other suitable point, depending upon the timing of the Geneva drive. When the tray halts, the member 58 descends and accurately spots the tray, the grip head or chuck following and grips the ware and transfers it to the molds A on the trays B of the upper supplemental drier 5ᵃ, the conveyor 6ᵇ of the latter drier or treating chamber being illustrated as moving in the direction of the arrows, the Geneva drive being timed to also halt the trays B at the proper position in said chamber. Prior to the transfer operation just specified, the molds A on the trays B have the part a thereof charged with slip or clay in the desired plastic or fluid state, this operation preferably ensuing a step in advance of the point of transfer of the ware to the upper chamber 5ᵃ. However, this may be regulated in accordance with the method adopted and the time required to permit the slip or plastic handle or other figure to set or reach that state which is found most suitable for attachment to the ware.

The operation of the charger 42 and nozzle 73 may be varied in accordance with the condition of the plastic clay or slip and character of the handle or figure to be applied to the ware. However, as an example, the tube or conduit 46ᵃ may connect with a source of supply such as the tank T, Fig. 19, and the tube or conduit 47ᵃ with the inlet 73ᶠ of the nozzle 73. If it should be found desirable to remove excess applied slip or clay automatically, the tube or conduit 49ᵃ of the charger may be attached to the nipple 74ᵇ of valve 74, and the tube or conduit 48ᵃ may be connected with a place of deposit of the excess material. As the tray B carrying the molds A is halted adjacent the nozzle 73, the latter moves over and lowers into position relatively to the mold a, the member 76 accurately spotting the tray and holding same steady. The cam 53 is timed on shaft 34 so as to give an impulse to the piston 50 of the charger 42 when the valve is in position on the mold a and force a charge of clay or slip into the chamber 73ᵇ and through the nozzle 73ᵉ, the size of the charge depending upon the size of the handle or figure to be applied to the ware, the excess material if any being sucked back between the outer and inner nozzles and into the excess-material chamber 73ᵍ and upwardly into valve chamber 74, this action being facilitated by suction due to downward travel of piston 50. The small or supplemental mold $a$ may be filled slightly above its level or in excess of its capacity if desired, so that when the cup or article of ware is deposited thereon, a slight bead will be formed and thus eleminate crevices or cracks at the line of jointure, with resulting advantages. If the material is in such a fluid state as will readily flow, the supplemental mold $a$ may still be filled in excess of its capacity, the capillary attraction inherent in the material permitting the forming of a convex meniscus above the normal level of said mold. After the charge has been applied, the nozzle 73 is raised clear of the mold and moved back, the plunger or piston 50 of the charger 42 being retracted, and any excess material that may have been withdrawn from the valve chamber 74 into the charger 42 above the piston 50 will be forced outwardly through the tube or conduit 48ᵃ to the place of deposit therefor.

When the supplemental mold $a$ is fully charged and the valve 73 withdrawn, the tray B bearing the charged molds is advanced or lowered adjacent the point of transfer of the ware from the lower to the upper drier and the ware deposited thereon, the transfer chuck preferably being adjusted so as to lower the ware on the molds A at an angle, and as the head withdraws, lower the ware fully in position on the mold, and thus avoid entrapping air between the ware and mold and which might result if the ware were placed directly flush on the mold. After the ware has been deposited on the mold in contact with the handle or other figure in its plastic state, the molds A are conveyed through the supplemental chamber 5ᵃ until the handle reaches the proper degree of hardness or sets, the trays B by this time having reached a point adjacent the ware removing and transfer and boxing structure illustrated at the right of Figs. 1 and 2, where the trays are again halted and the transfer chuck grips the ware now having the handles joined thereto and transfers same back to the lower drier 5 on top of the ware in each alternate tray 8, the trays being spotted by the member 90 for the chuck or grip head and by the registering devices 68 and 71 for the application of super and/or sub-atmosphere to the molds A to part same sufficiently to release the handles, the type of mold A shown in cross section in Fig. 11 being adapted for super-atmosphere. However, any type of mold A may be used as will be hereinafter apparent.

As the ware is removed from the upper drier 5ᵃ, the grip head swings in an arc past and in contact with the moistening sponge or wick in the container 98, cam 97 being adjusted on shaft 12 to actuate levers 94 and links 96 connected to crosshead 92, thus elevating chuck members 91 through the recessed trays 8 of the lower drier with the molds C thereon carrying ware without handles to a predetermined adjusted point adjacent the path of travel of the grip head, the latter depositing the ware in edge or brim-abutting relation or boxing the ware. The molds C with the boxed ware thereon are then lowered onto the trays 8 and may then be conveyed through the drier until thoroughly dried or be conveyed to any suitable or desired point for further operations thereon.

Figs. 5, 6, 7 and 8 illustrate a rearrangement and modification of the structure shown by Figs. 1 to 2, inclusive, whereby the ware may be handled or figured and boxed on each tray and without removing the ware from the main drier. As the supplemental sliding frame 18 and cooperating structure are essentially the same as in Figs. 1 and 2, like reference numerals designate corresponding parts. However, it is preferred to dispose these frame units at right angles to the similar units in Figs. 1 and 2, as will be noted in Fig. 5.

Fig. 7 illustrates in end elevation the formed or cast or jiggered ware being transferred from the molds C to the molds A, the tray carrying the molds being indicated at B'. By referring to Fig. 5, it will be noted that the nozzle member 73 is in this instance mounted on a movable bracket 101, which is pivotally mounted on the one extremity of a lever 102, said lever at its opposite extremity being pivotally and adjustably secured as in Figs. 3 and 3ᵃ to a bracket 103, which is secured to the stationary cross brace structure 16ᵇ. The upper extremity of the movable bracket 101 is inclined at an angle as at 101ᵃ, this inclined portion being adapted to contact with a screw 101ᵇ, adjustably threaded in the lower angular extremity of a contact bracket 101ᶜ, which may also be secured to the cross brace structure 16ᵇ. A retraction spring 101ᵈ is secured at opposite extremities respectively to the one extremity of the lever 102 and the movable bracket 101. A cam 104 is adjustably secured as in Fig. 4 on the motion plate shaft 12, see Fig. 6, said cam being adapted to contact with a roller 102ᵃ rotatably mounted on lever 102. It will be seen that lever 102 may be actuated by cam 104 to lower and raise nozzle member 73 and also treating head 75 into and out of position relatively to the molds A, and when said nozzle is raised, movable bracket 101 contacts with screw 101ᵇ, the latter causing the nozzle member and also member 75 to swing to one side to clear the molds, said screw being adjustable to regulate the extent of this clearance movement during the raising of nozzle member 73 and member 75, the extension bracket for supporting the latter being shown in this instance as projecting at right angles from bracket 101. A limiting screw 22ª is mounted on a stationary part of the apparatus or on the drier and adjusted relatively to movable bracket 101, to serve as an auxiliary positioning means for the nozzle member 73 and head 75. The nozzle member 73 and head 75 may be positioned while the machine is in operation by adjusting the pivotal connection of lever 102 and angular position of cam 104, to thereby vary the throw and phase of motion of said lever.

Fig. 6 shows the drive for the various units as being transmitted from the motion plate shaft 12 to the shaft 34 by bevel or mitre gears 105 and 106, the shaft 34 being adjustably coupled for longitudinal adjustment as by sleeve 107, to provide for arranging the slip or plastic clay applying units varying distances from the ware transfer and boxing units along the drier.

Fig. 7 illustrates the ware in the process of being transferred from the forming molds C to the handle or figure-applying molds A subsequent to the application of slip or clay to the latter, the slip or clay being applied in a manner substantially similar to this operation as described in connection with Figs. 1 and 2, and Fig. 8 shows the ware undergoing the boxing operation. For the purposes of illustration, a number of slightly different methods or structures for imparting the necessary transfer movements to the chuck or grip head 31 are shown, but the principle of operation is essentially the same in each instance, it being understood that variations in structure in this regard fall within the scope of the invention.

In the structure at the right of Fig. 7, the grip head stem 30 is shown as secured on a stub shaft or pin 108, the latter being pivotally mounted or having bearing in a supporting bracket 109, see Fig. 7ª, secured to the lower horizontal slide bar 21. The bracket 109 also serves to support a guide bracket 110, in which a rack 111 is slidably mounted, a roller 111ª being rotatably mounted on the upper extremity of rack 111, said roller being adapted to contact with a guide block or cam member 112, which is adjustably secured to the frame 18 as by bolts 112ᵉ and the frame slotted to provide for adjustability. A gear 113 is also secured on the stub shaft 108, the teeth of the rack 111 and gear 113 being in continual mesh. A further retaining and guide bracket 110ª for the rack 111 is secured to the lower extremity of bracket 109. The operation should be obvious. When the frame rises, it carries the grip head and ware upwardly to clear the mold, and the slide bar moving laterally, carries the assembly therewith, the roller 111ª contacting with cam 112 and causing the grip head and ware to swing in an arc to the dotted line position in Fig. 7.

The moistening device 98 is slightly modified in this instance and applied directly on the ware chuck or grip head as shown in Fig. 7ª.

At the left of Fig. 7 the grip head stem 30 is shown as being formed with a cam portion 112ᵇ, which may be made integral with or detachably secured to said stem, the stem and cam being pivotally mounted or having bearing on a pin 114, which may be secured in a bracket 115, the latter being secured to the slide bar 21 as at 115ª. A cam-contacting pin or roller 116 is mounted on a bracket 116ª, which may form part of or be detachably secured to the frame 18. In operation, when the frame rises, the grip head and ware are carried therewith until the mold C is cleared or to any desirable point, and when the bar 21 slides laterally, cam 112ᵇ contacts with pin or roller 116 and swings the ware and chuck in an arc and onto the mold A, the position shown in Fig. 7. The working surfaces of cam portions 112 and 112ᵇ serve to permit withdrawal of the transfer chucks from the interior of deep ware either horizontally or at an angle depending on the shape of said cam portions.

Fig. 8 shows the ware in the process of transfer from the molds A to boxing racks or holders generally indicated at D, and which comprises a base d, which may be of metal or other suitable material, having a plurality of guards or fingers d' projecting upwardly therefrom, see Fig. 6, and preferably extending above the lower article of ware, to provide a place for the brim of the top cup or article of ware to definitely center relatively to the brim of the lower cup. These racks are preferably of open construction, to facilitate drying of the ware. The transfer assembly of the left unit in Fig. 8 is shown as being of substantially the same construction as that at the left of Fig. 7, practically the only difference being in the shape of the cam 112ᵇ, which is indicated in dotted lines in Fig. 8, and the assembly at the right of Fig. 8 may also be readily understood in view of Fig. 8ª and the preceding structures, the chuck or grip head 31 in this instance being adapted for the bottom of the cup or other article of ware, as illustrated in Fig. 9, the dotted lines above the boxing rack D in Fig. 8 showing the alternate position of this latter grip head and how the ware may be disposed in the boxing racks. The alternate position of the transfer assembly of the left unit in Fig. 8 is also shown in dotted lines above the mold A. A spring 112ᶜ is connected at opposite extremities, respectively, to the stem 30 and the slide bar 21, in the transfer assembly of Fig. 8ª, to apply additional pressure and ensure contact of the said grip head relatively to the ware.

From the foregoing the operation of the structure illustrated by Figs. 5 to 8, inclusive, will be apparent. Each tray is shown as carrying two forming molds C, two handle or figure applying molds A and one boxing rack or form D, and this number may be increased or decreased in accordance with the number of units employed. By referring to the side view in Fig. 5, it will be seen that the trays may be first halted for application of the slip to the supplemental molds $a$ of the molds A, and this operation may take place a suitable distance from the point of transfer of the ware to the said molds A. In some instances it may be desired to have the slip or clay set or stiffen prior to applying the handle or figure to the ware, but ordinarily by the method herein disclosed the handle and ware may be joined immediately, this being one of the advantageous features of the present invention. Cams 104 and 53 are adjusted on shaft 12 to primarily actuate levers 102 and 51 to move nozzle member 73 into position as well as treating head 75 and actuate plunger 50 to charge the supplemental mold $a$ of mold A, after which the nozzle is moved upwardly and outwardly to clear the mold. The trays then resume their forward movement until halted for the transfer of the ware from the molds C to the molds A as illustrated in Fig. 7 in full and dotted lines. The final operation is illustrated in Fig. 8, where the registering devices 68 and 71 function and super and/or sub-atmosphere is applied to the molds A and $a$ and the handled or figured ware is transferred therefrom to the boxing racks D. It will be understood that the nozzle member 73 and treating head 75 are interchangeably mounted as in Figs. 1 to 2, inclusive, with the same object in view.

Figs. 13 and 14 illustrate a modification in structure of the mold A relatively to the assembly shown by Figs. 11 and 12, the type of mold disclosed in Figs. 13 and 14 being adapted for operation by either super or sub-atmosphere and may be considered more suitable for instances where it is desired to apply appendages such as beads, designs, etc., on the outer surface of the ware. In this instance the assembly comprises the frame 61, body members 59 and $59^a$, piston $60'$ and spring $62'$, cover $59^c$ having cup-leather packing or gasket $59^d$. In assembling, the spring and piston may be inserted in the chambered portion of the body member $59^a$, the cover $59^c$ applied thereover and threaded in place, and the stem of the piston then adjustably threaded through the frame 61 and a lock nut or analogous member 117 applied on said stem to hold the piston stationary relatively to said body member 59 or $59^a$, it being understood that this assembly is to be applied at opposite sides of the mold A. The bore $60^b$ of the piston $60'$ opens into the chambered portion of the body member $59^a$ on either side of the head of said piston, a screw plug 118 being provided and this plug may be inserted in the end of said bore $60^b$ (the position shown) or a number of these plugs may be inserted in bores $118^a$. In the present position of plug 118, the mold A is adapted to be parted by air under pressure, while if the bores $118^a$ be closed and the bore $60^b$ open into the chamber in which the spring is shown seated, the mold may be parted by the application of sub-atmospheric pressure or suction, as will be understood. A limiting screw 119 is adjustably threaded through the frame 61 and adapted to limit the opening movement of the body members 59 and $59^a$. A ventilating opening $120^c$ is formed in the wall of the member $59^a$, and in the event the mold is parted by sub-atmospheric pressure, this opening should be closed. It may be desirable to introduce super or sub-atmosphere to the chambered portion $64^b$ to condition the plaster portion $a$ as by evacuating air therefrom, and this operation may be desired prior to or while applying super or sub-atmospheric pressure to open the mold A, and with this end in view, a port 120 is formed in the body $59^a$ and provided with a nipple $120^a$ for connection thereto of a hose or similar flexible member leading to one of the valves 32. Port 120 may be regulated as by screw $120^b$.

As above specified, it will be understood that the assembly just described is applied to the body member 59 on the opposite side of the mold, Fig. 13 showing one side only.

Filling and/or vacuum or sub-atmosphere and excess material conduits 121, 122 and 123, or any number thereof, may be formed in the abutting surfaces of the body members 59 and $59^a$ as by grooving the latter, and slip or plastic clay may be applied through any one or two of said conduits and excess material removed by way of the remaining conduit or conduits by application of sub-atmospheric pressure thereto. In this form of mold, the ware may be deposited in the mold prior to applying the slip or clay, so that when the latter is applied, it will fill the mold portions defining the handle, bead or other figure to be applied to the ware, and this action may result from sub-atmospheric application to the mold walls and/or pressure from the charger 42 or from head pressure due to the plastic material or slip seeking its own level, as hereinafter explained in connection with Fig. 19. In applying the slip or clay to this form of mold, the nozzle member 73 is modified to include the nozzles 124 and 125, see Fig. 19, and the mouths of the conduits 121, 122 and 123 are enlarged as at $121^a$, $122^a$ and $123^a$, to provide nozzle centering and registering portions. The nozzles 124 and 125 are externally threaded and have adjustably mounted thereon limiting and centering members shown in the form of annular nuts $124^a$ and $125^a$, which are contoured to seat into the cut-out or enlarged mouths $121^a$, $122^a$ and 123ᵃ of conduits 121, 122 and 123. The nozzle 125 connects with a hose or flexible member leading to one of the valves 32 and the nozzle 124 with the slip or clay supply hose 47ᵃ.

A cavity 120ᵈ is formed in the bottom portion of the supplemental mold a and communicate with the exterior through a conduit 120ᵉ, a hose nipple 120ᶠ being attached to said conduit for connection of a suitable flexible member or hose leading to a source of sub and/or super-atmosphere and controlled or regulated by means such as one of the valves 32. As an example, prior to opening the mold, super-atmosphere may be applied to cavity or chambers 64ᵇ and sub-atmosphere to cavity 120ᵈ, to prevent sticking or adherence of the ware to the sides of the mold and shifting of the ware on the bottom of the mold and which might result in distortion of the ware, and at the time of transfer of the ware and when the mold is opened, super-atmosphere may be applied to cavity 120ᵈ to ensure release of the ware from the bottom of the mold. By first applying sub-atmosphere to prevent shifting of the ware, the latter may be accurately positioned for the grip head or chuck.

During the rather prolonged period the grip head or chuck is in engagement with the ware during transfer thereof to the mold, a sub-atmospheric condition is set up in the walls of the ware, which being in a leather-hard state reaches a sub-atmospheric saturation point rather sluggishly and, conversely, retards dissipation of this sub-atmospheric condition, and this sub-atmospheric condition is communicated through said walls to the clay or clay slip and aids in extracting moisture and air pockets at the points of jointure and also between the ware and mold. To facilitate this action, the chuck may be permitted to remain in the ware a short time after deposit thereof in the mold, and furthermore, any number of the vents 65ᵇ may be formed in the mold to permit this sub-atmospheric condition to be more readily set up in the walls of the ware.

Assuming that it is desired to open the molds A of the form shown in Figs. 13 and 14 by air under pressure or super-atmosphere, then the plug 118 may remain in the position shown, and as the tray B moves opposite and the trunnions b register with the devices 68 and 71 and air under pressure is applied to the mold through the bores 60ᵇ of the pistons 60', the air passes through the port 64 into the closed chambers or enlarged portions 64ᵇ of said bore and impregnates or fills the pores of the supplemental mold a and then exerts an equalized pressure on the covers 59ᶜ of the piston assemblies and causes the sections of the molds a and A to slide back while the pistons remain stationary, or, if desired, air under pressure may be preliminarily and separately applied through port 120 and impregnate the pores of the mold and through vents 65 set up a super-atmospheric condition between the ware and mold prior to the final operation of applying pressure by way of piston bores 60ᵇ, so that the latter operation may be practically instantaneous and the ware dislodged for the transfer operation.

It may be of advantage, also, to preliminarily and separately apply sub-atmosphere through ports 120 and 120ᵉ to set up a general sub-atmospheric condition between the ware and mold to extract moisture and dissipate air pockets, and then part the mold by super-atmopheric pressure through the piston bores 60ᵇ, or, as above noted, sub-atmosphere may be applied through bore 120ᵉ to cavity 120ᵈ to prevent shifting and sticking of the ware to the sides of the mold a, and super-atmosphere through bore 120 to preliminarily impregnate the mold a prior to the final operation of parting the mold. If the mold is to be parted by suction or sub-atmospheric pressure, the plug 118 may be removed and the holes 118ᵃ and 120ᵉ closed, and the mold sections will then slide back when sufficient suction is applied to the piston chambers in which the springs 62' are seated. By filling or impregnating the mold a with air under pressure prior to parting the mold, any tendency of the clay to adhere to the mold walls will be overcome. By applying sub-atmosphere to the freshly applied slip or clay through one of the conduits 121, 122 or 123, any tendency toward the formation of air pockets in the ware will also be overcome.

In transferring the ware from the forming molds C to the molds A of the form illustrated in Figs. 13 and 14, it is desirable that the ware be deposited in said latter molds in an upright position. In the structure shown by Figs. 5 to 8, inclusive, the grip head and stem are attached to the bars 21 and simply lower into or on the ware and transfer in an upright position, but in the structure of Figs. 1 to 2, inclusive, it is preferred to pivotally secure the stem 30 to the grip head as shown in Figs. 13 and 14, so that the head and ware assume an upright position through gravity when being deposited in the molds and also when transferred therefrom to the racks D. However, if a bead or figure or other embellishment be applied to the ware in conjunction with a handle, it may be desirable to trim off the gate that may result due to some of the slip or clay remaining in the connecting conduit 121ᵇ, in which event the ware may be manually trimmed while in a leather-hard condition and also boxed manually. Spotting screws 21ᵇ and 21ᶜ are mounted on the stem 30 in Figs. 13 and 14, the screw 21ᵇ spotting and limiting the head when lowering to remove the ware from the forming molds C, and the screw 21ᶜ serving the same function when the ware is being deposited in the molds A in the treating chamber or drier 5a.

Fig. 19 illustrates a construction which may be adopted in applying slip or plastic material in a more or less fluid state to the handle or figure molds A through siphoning action. The assembly illustrated includes parts which may be dispensed with by slightly varying the operation of the structure as a whole, but for the sake of brevity, the parts are herein shown as comprised in one figure. The numeral 126 indicates a tank or receptacle which may be of any size and supported in any convenient manner. In certain instances a float 127 may be disposed in said tank and carried by a lever 127a, which is pivoted to the tank, said lever being provided with a valve member 127b adapted to function relatively to a pipe 127c, which is provided with a valve 127d. The plunger stem 50a of the charger plunger 50 has a bracket 128 adjustably clamped or otherwise secured thereon as by a screw 128a, said bracket being adapted to movably or slidably and resiliently support a valve 129 having a stem 129a, which extends through said bracket, springs 129b and 129c being mounted on said stem above and below the bracket and adjustably maintained in position as by collars 129b and 129e. The valve 129 projects into a valve-supporting and guide block 130 having a valve chamber 130a, said valve 129 functioning relatively to pipe 127c and a further pipe 131, which is provided with a valve 131a, said pipe 131 being shown as communicating at one extremity with the valve chamber 130a and at its opposite extremity with a pipe 132, which is provided with a valve 132a and a check valve 132b, the latter being in the form of a ball of hollow construction to reduce weight, the pipe 132 in turn communicating at one extremity with the tank 126 and at its opposite extremity with the supplemental mold a of the mold A through nozzle 124. The upper wall of the tank 126 is provided with an overflow or outlet pipe 133, controlled by a valve 133a, and this pipe also serves to regulate the level of the liquid in tank 126.

In operation, the tank 126 may be permitted to fill with slip or clay to a predetermined level in accordance with the head required, and assuming it is desired to operate the apparatus with the float 127 and cooperating parts, the plunger 50 may be adjusted to prime or give a preliminary impulse to the fluid clay or slip and start a flow thereof from nozzle 124, after which the mold is charged through siphoning action, the molds A preferably being halted at a point below the level of the slip in the tank 126 in accordance with the depth of the charge to be applied thereto, and when the mold is filled to a predetermined level or to the level of the slip in the tank 126, the siphoning action will automatically cease, as will be understood, due to the law of liquids seeking their own level and hydrostatic head. In the instance shown, the nozzles 124 and 125 are positioned relatively to a spout mold, and subatmospheric pressure is applied to withdraw the core of the spout, as described in connection with Fig. 18. However, in the event the article to be cast does not require withdrawal of the core, it may be desired to apply sub-atmosphere to remove excess clay as in the previous structures and in which case the nozzle 125 should be positioned slightly above the level to be reached by the slip. The stroke of valve 129 may be adjusted through collars 129d and 129e so that the valve 129 seats in the inlet to pipe 131 on the down stroke of plunger 50, thus closing the priming conduit 131 and opening the passage through pipe 127c, and if the level of the slip in tank 126 is then below the normal or predetermined level, slip is permitted to flow in through pipe 127c until the rising float closes the outlet of said pipe through the medium of valve member 127b. Check valve 132b prevents the flow of slip into the tank 126 during the priming operation.

It will be obvious that a certain level of slip could be maintained in tank 126 without the float valve by pipe 133, which may connect back to the supply tank T, and furthermore, the siphoning action could be initiated by other means than that described, as for instance by applying sub-atmosphere to the nozzle 125, and other obvious modifications and adaptations in structure made without departing from the scope of the invention.

Fig. 18 illustrates a method of making spouts, hollow handles and the like. In this instance the slip may be appled to the mold, either manually or automatically, through nozzle 124 and then permitted to set until some of the fluid is absorbed in the porous walls of the mold and the clay to some extent thickens or sets adjacent the walls. Suction or sub-atmosphere may then be applied through nozzle 125 and/or super-atmosphere or air under pressure through nozzle 124 just sufficient to withdraw or force the slip from the core. In the instance shown, an annular limiting member or ring 125b is disposed at the termination of the mold cavity defining the spout, said ring preferably being halved or in sections and having a bore through which the core is extracted. The conduit surface of the mold cavity leading to said ring is preferably rendered non-absorbent, and the ring is preferably formed of absorbent material and the bore thereof treated to render same non-absorbent, and thus no wall is formed in said bore, so that the annular end edge of the spout when cast is smooth or regular.

Figs. 20, 21 and 22 illustrate a means of adapting the molds A to a table or annular conveyor. In this instance the ware may be deposited in and removed from the molds manually, as for instance, the conveyor may be installed adjacent a turning lathe, and the ware taken from the lathe and placed in the molds A and the handles or figures applied thereto and then subsequently the ware may be removed and boxed and placed on trays or ware boards and conveyed through the drier to complete the drying operation.

The reference numeral 134 generally designates an annular conveyor which may be intermittently operated by a Geneva movement, the entire mechanism being mounted on a portable truck platform, as at 134$^a$, and having bearing on an upright shaft 135, the drive preferably being through the medium of a motion plate 136 adjustably secured as by screw 136$^a$ on an upright shaft 137, and gear 138 rotatably mounted on shaft 137, and drive pinion 139, which may be adjustably secured as by screw 139$^a$ on a drive shaft 139$^b$. The drive on the motion plate may be continuous but is preferably intermittent, in which latter event a suitable clutch structure may be adopted, an example of which is shown in Fig. 22, the clutch illustrated being of the friction cone type, the cone 140 having the gear 138 secured thereto and being slidably mounted on shaft 137. The hub 140$^a$ of the cone is provided with an annular groove or recess 140$^b$, to accommodate a clutch yoke or fork 141 having a lever extension 141$^a$, which may be fulcrumed on a stationary part of the frame as at 141$^b$, said extension having a lever 141$^c$ pivotally connected thereto, the latter in turn being fulcrumed at 141$^d$ and extending to a convenient point or within distance of an operator and provided with a foot pedal as at 141$^e$, see Fig. 20. A clutch collar 142 is adjustably secured on shaft 137 and serve to adjustably support the cone 140 and gear 138 when in disengaged position. While the clutch may be manually disengaged or released, provision is made in the present instance for automatically disengaging the clutch upon each complete revolution of the motion plate 136. The motion plate is bored and recessed at right angles to provide a guideway and support for a release pin 143, which is inserted in the bore and a lug 143$^a$ driven or otherwise secured therein and project outwardly therefrom, said lug being adapted to contact with a stationary release bracket 144, which is formed with an inclined or wedge-shaped contact surface and adjustably mounted as at 144$^a$ within operative adjacency of the motion plate on a stationary part of the frame 134$^b$ of the machine.

The molds A in this instance may be of a modified construction to better adapt same to the annular conveyor 134, said molds being automatically opened and closed as by a toggle link and cam assembly which may be readily understood by referring to Figs. 20 and 21. The halves or sections 59 and 59$^a$ are formed at one extremity with hinge members 145 and 146 which are pivotally mounted on a pivot pin 147, the latter being secured in a base member 134$^c$ adapted to be secured on the table 134 as by countersunk screws 134$^d$, each hinge member being formed with angular lugs or ears 145$^a$ and 146$^a$, which have pivotally connected thereto links 148, see Fig. 20, each link being also pivoted to the opposite extremities of a sliding cross head or analogous member 149, which is slidably mounted on a supporting bar 150 against the tension of a spring 151, each bar being secured in and projecting radially from brackets 152, which may be made integral with or secured on the table 134. At an intermediate point each cross head or member 149 is provided with a cam-contact pin 153, adapted to contact with a cam 154, adjustably secured in the present instance as at 154$^a$ on a supporting bracket 155, which in turn is adjustably secured on the stationary shaft 135 as at 155$^a$. The mold is provided with a cover member 61$^c$ secured to the base member 134$^c$ as by pins 63$^d$, the latter also serving the function of the member 63 in Fig. 11$^a$.

The chargers 42 and nozzle members 73 may be operated in a manner substantially similar to the chargers and nozzle members illustrated in Fig. 5, levers 51 and 102 in Fig. 20 being shown as adjustably pivoted to the frame 134$^b$ as in Figs. 3 and 3$^a$, and cams 53 and 104 adjustably mounted as in Fig. 4 on a horizontal shaft 156, which is driven from the motion plate shaft 137 through the medium of suitable mitre or bevel gears 157 and 158. The supporting bracket 101 for nozzle member 73 may be mounted for straight vertical movement if desired, it not being necessary to swing the nozzle clear as in Fig. 5. The registering devices 68 are adjustably mounted adjacent the table on a stationary bracket 159, and to permit application of super and/or sub-atmosphere to the molds to evacuate air-pockets, excess moisture and otherwise treat the same, the table is bored, as indicated in dotted lines at 160, said bores registering at one extremity with the conduits 120, not shown, which in this instance are formed in the bottom of the mold, and at their opposite extremities these bores terminate in concavities formed in the peripheral portion of the table or conveyor and indicated at 161. The registering devices 68 are provided with a suitable hose connection leading to the valves 32 as in the prior structures, and the concavities 161 are adapted to register with the plunger 68$^c$ during the rotary movement of the conveyor. The molds A in this instance are adapted for forming and applying handles on two articles of ware simultaneously.

In operation, assuming it is desired to use the clutch, the operator or turner may stand in the circle, drawn simply for the purposes of illustration, and as each mold A is charged with slip, deposit the ware on the mold, then depress the pedal 141ᶜ and permit the motion plate to make one complete revolution, bringing a new mold or molds in position, and after the table 134 has revolved approximately one complete turn or part thereof, depending upon the adjusted position of cam 154, cam pin 153 contacts with cam 154, sliding cross head 149 back and separating the mold to permit removal of the handled or figured ware, which may then be boxed, placed on the ware boards and conveyed through the drier.

Figs. 25 and 25ᵃ illustrate a type of jig or analogous device adapted for manual application of handles to ware. The body 162 of the jig is formed with a cavity for the ware and also recessed or cut-out for slidable insertion of a gage 163, which is formed with a cavity defining the handle. By this means the handle may be joined to the ware without distortion and in perfect alinement by unskilled labor as well as skilled labor. A handle may have its joining surface first moistened, then placed in the gage, the ware being placed in the jig and the gage moved adjacent the ware to press the handle against the ware, to thereby guide and attach the handle at a definite point and in a definite position. By placing the handle in the gage, the handle may readily be applied without distortion or pressing out of shape as is usually the case with handles as ordinarily applied. It will readily be seen that the gage exerts an equally distributed pressure at all points of the handle when the latter is pressed against the ware.

In Figs. 26 and 26ᵃ the jig 162ᵃ is simply formed with a cavity to provide a seat for the ware, the gage 163ᵃ in this instance being adjustably secured on the jig as by slotting said gage and inserting screws 164. The ware and handle may be placed on the jig, and when pressing the handle against the ware, the operator may use the gage to aline the handle longitudinally, the upper surface of the jig ensuring radial alinement. The gage may be adjusted to the proper position for applying handles to a particular line of articles of ware and remain in adjusted position while applying handles thereto, thus ensuring uniform application to each article.

Fig. 27 illustrates a method of hanging the mold-carrying trays, the trays in this instance being suspended from the conveyor chains at diagonal points instead of at opposite points, thus preventing tilting of the trays while at the same time they are always maintained in upright position regardless of the direction of movement of the conveyor.

What is claimed as new is:

1. In apparatus for applying appendages to ware in the manufacture of pottery, the combination with a mold in which the ware is formed, of an appendage mold, means for charging said latter mold with clay in a fluid or semi-fluid state, and means for transferring the article of ware from one of said molds to the other.

2. In apparatus for applying appendages to ware in the manufacture of pottery, the combination with a mold in which the ware is formed, of a partible appendage mold, means for charging said latter mold with clay in a fluid or semi-fluid state, means for transferring the ware from said first-named mold to said last-named mold, and a means for automatically parting said partible mold.

3. In apparatus for applying appendages to ware in the manufacture of pottery, the combination with a mold in which the ware is formed, of a partible appendage mold, means for charging said latter mold with clay in a fluid or semi-fluid state, means for transferring the ware from said forming mold to said appendage mold, means for automatically parting said latter mold, and means for re-transferring and boxing the ware.

4. Apparatus of the class specified, comprising in combination a conveyor having mold-carrying trays mounted thereon, forming molds carrying articles of ware, partible molds, means for charging said latter molds with measured quantities of clay in a fluid or semi-fluid state, means for parting said partible molds, ware-transferring apparatus, and means for actuating said conveyor, charging means, parting means and transfer apparatus in synchronism.

5. Apparatus for applying appendages to ware in the manufacture of pottery, comprising in combination, a mold, in which the ware is formed, a partible mold, means for charging said latter mold with a measured quantity of clay in a fluid or semi-fluid state, means for transferring the ware from said first-named mold to said partible mold, and means for applying super and (or) sub-atmospheric pressure to said partible mold.

6. In apparatus of the class specified, a conveyor, a plurality of mold-carrying trays mounted in said conveyor, partible molds mounted on said trays and comprising separable sections, means for driving the conveyor, and means for separating and re-associating said sections at predetermined points along the path of travel of said trays.

7. In a pottery fabricating machine, the combination with a main drier and a supplemental treating chamber mounted adjacent thereto, of conveyors mounted in said drier and said chamber, mold-carrying trays mounted in said conveyors, forming molds containing partly fabricated articles of ware carried by the trays of one conveyor and appendage molds carried by the trays of the other conveyor, means for charging the appendage molds with clay in a fluid or semi-fluid state, and means for transferring the ware from the forming molds to the appendage molds to complete the fabricating operation.

8. In a pottery fabricating machine, in combination, a mold, a movably mounted nozzle member, a charging device, a movably mounted ware-transferring chuck, means for moving said nozzle member and said chuck in a predetermined path terminating at a point adjacent said mold, and means for defining said path.

9. A partible mold for use in the manufacture of pottery, comprising a plurality of cooperating movably mounted, normally abutting mold sections provided with a mold portion proper of porous absorbent material, and a means for automatically retracting said sections from abutting relation.

10. A partible mold for use in the manufacture of pottery, comprising a plurality of cooperating, movably and resiliently mounted, normally abutting mold sections provided with a mold portion proper of porous absorbent material, and a means for retracting said sections from abutting relation, the retracting force being automatically equalized relatively to said sections and acting to move said sections simultaneously.

11. A partible mold for use in the manufacture of pottery, comprising a plurality of cooperating mold sections formed with conduits, and means for applying sub and (or) super-atmosphere to said conduits.

12. A partible mold for use in the manufacture of pottery, comprising a plurality of cooperating body sections, a plurality of porous sub-sections carried by said body sections, and a means for establishing an abnormal atmospheric condition in said sub-sections.

13. In apparatus of the class specified, a mold adapted to receive a charge of plastic material in a fluid or semi-fluid state, a measuring and charging device, means for operating said device to apply a measured charge, and a nozzle member adapted to definitely locate the point of application of said charge.

14. In apparatus of the class specified, a pulsating device for supplying clay in a fluid or semi-fluid state to molds, and means for imparting pulsations to said device to deliver the clay in measured charges.

15. In apparatus of the class specified, a device for supplying clay in a fluid or semi-fluid state to molds in measured charges, and means for varying the quantity of clay comprised in said charges.

16. In apparatus of the class specified, in combination, a flexible conveyor adapted to move in a rectilinear plane, mold-carrying trays mounted in said conveyor, means for intermittently advancing said conveyor, and a positioning device mounted adjacent the path of travel of said conveyor and operating to automatically spot the position of rest of said trays.

17. In apparatus of the class specified, the combination with an endless flexible conveyor adapted to move in a rectilinear plane, means for driving said conveyor, partible molds supported on said conveyor, and a means for automatically opening and closing said molds.

18. In apparatus of the class specified, in combination, an endless flexible conveyor adapted to move in a rectilinear plane, means for intermittently driving said conveyor, mold-carrying trays mounted in said conveyor, partible molds disposed in said trays, said molds comprising movably and normally abutting, cooperating sections, and a means for opening and maintaining said sections in open position for predetermined intervals of time and at predetermined points along the path of movement of said conveyor.

19. The method of applying appendages to ware in the manufacture of pottery, which consists in providing a mold with a cavity defining the appendage, charging said cavity with clay in a fluid or semi-fluid state, forming and conditioning the ware in a separate mold and joining the ware to the appendage before the joining surface has set, to thus obviate the necessity of applying a binding agent prior to said joining.

20. The method of applying appendages such as handles, figures and the like to ware in the manufacture of pottery, which consists in providing a mold with a cavity defining the appendage, charging said cavity with clay slip above the normal level of the cavity, the excess slip protruding from said cavity due to the inherent capilliary attraction and surface tension of the fluid-like clay, and subsequently disposing an article of ware in a semi-dry condition against the protruding clay.

21. The method of applying appendages such as handles, figures and the like to ware in the manufacture of pottery, which consists in providing a partible mold with a cavity defining the appendage, charging said cavity with clay in a fluid or semi-fluid state, disposing an article of ware against the exposed clay in said cavity, applying sub-atmosphere to the mold to dissipate air pockets from the walls of the cavity, and applying super-atmosphere when parting the mold to and repel the clay from the walls of the cavity.

22. The method of applying appendages such as handles, figures and the like to ware in the manufacture of pottery, which consists in providing a mold with a cavity defining the appendage, charging said cavity in excess of its capacity with clay in a fluid or semi-fluid state, applying sub-atmosphere to remove excess material, and joining the ware to the appendage prior to removal of the latter from the cavity.

23. The method of feeding clay slip to molds in the manufacture of pottery, which consists in establishing a flow of slip from a source of supply into a reservoir, advancing a series of molds and successively halting said molds in a predetermined horizontal plane relatively to the normal level of the slip in the reservoir, giving a preliminary impulse to the slip to initiate a flow by gravity into the mold, the flow being interrupted when the slip in the mold attains a level equal to the level of the slip in the reservoir.

24. The method of forming spouts, hollow handles and the like in the manufacture of pottery, which consists in charging a porous mold having a cavity defining the handle or spout, with clay slip, the porous walls of the cavity absorbing moisture from the slip and the clay forming an outer shell against the walls of the cavity, and applying super and (or) sub-atmospheric pressure to eject or withdraw the fluid core of the shell.

25. The method of applying appendages such as handles, figures and the like to ware in the manufacture of pottery, which consists in moving a series of partible appendage molds successively into charging position, charging each mold with a measured charge of clay in a fluid or semi-fluid state, transferring the ware to said appendage molds in contact with the clay, and subsequently parting said molds to release the appendage after a bond has been formed between the appendage and ware.

26. Apparatus for applying appendages to ware in the manufacture of pottery, comprising in combination, an appendage mold, means for charging said appendage mold with a measured quantity of clay in a fluid or semi-fluid state, means for disposing a formed article of ware in or on said appendage mold, and a means for establishing a sub-atmospheric condition in the walls of the ware at the joint of juncture, to assist in bonding the appendage to the ware.

27. In apparatus for applying appendages to ware in the manufacture of pottery, in combination, a forming mold in which the ware is shaped, an appendage mold formed with a seat for the ware and a cavity defining the appendage to be applied to the ware, means for charging said cavity with a predetermined quantity of clay in a fluid or semi-fluid state, and means for transferring the article of ware from said forming mold to said seat to join the ware to the appendage.

28. In apparatus for applying appendages to ware in the manufacture of pottery, in combination, a forming mold in which the ware is shaped, an appendage mold formed with a seat for the ware and a cavity defining the appendage to be applied to the ware, means for charging said cavity with a measured quantity of clay in a fluid or semi-fluid state, means for transferring the article of ware from said first-named mold to said seat to join the ware to the appendage, and means for altering the position of the ware during transfer.

29. In apparatus for applying appendages to ware in the manufacture of pottery, an appendage mold formed with a cavity shaped in accordance with the appendage to be applied to the ware, means for charging said cavity with a measured quantity of clay in a fluid or semi-fluid state, and means for establishing a sub-atmospheric condition in said mold and the walls of said cavity for attracting the clay to said walls and removing air pockets from the charge and assisting in moisture extraction.

30. In apparatus of the class specified, a mold carrying an article of formed ware, means for transferring said article of ware from said mold to a point of deposit, and means for moistening a portion of the ware during transfer thereof.

31. In apparatus of the class specified, a plurality of molds or analogous ware-supporting members carrying articles of formed ware therein, and a means for transferring the ware from one of said molds or members and disposing it in brim-abutting relation to the ware in another of said molds or members.

32. In apparatus of the class specified, a mold carrying an article of formed ware therein, a boxing rack, and means for transferring the ware from said mold to said rack.

33. In apparatus of the class specified, a nozzle member, a movable support for said member, means for moving said member in a predetermined path, and an adjustment means for defining said path.

34. In apparatus of the class specified, in combination, a charging and measuring device, a nozzle member communicating with the said device, a movable support for said member, a mold formed with a cavity, means for operating said device to charge said cavity with clay slip, and means for definitely positioning said nozzle member relatively to said cavity.

35. In apparatus of the class specified, the combination with a main drier and a supplemental drier mounted adjacent thereto, of ware conveyors carrying articles of formed ware, and means for transferring the ware from one drier to another.

36. In apparatus of the class specified, the combination with a main drier and a supplemental drier mounted adjacent thereto, of conveyors mounted in said driers, mold carrying trays mounted in said conveyors, forming molds containing partly fabricated articles of ware carried by the trays of the main drier and partible appendage molds carried by the trays of the supplemental drier, means for charging the appendage molds with clay in a fluid or semi-fluid state, means for transferring the ware from the forming molds to the partible appendage molds, and means for parting said appendage molds.

37. In apparatus of the class specified, in combination, a mold, a movably mounted nozzle member, a charging device, a movably mounted ware-transferring chuck, and means for moving said nozzle member and said chuck in a predetermined path terminating at a point adjacent said mold.

38. A partible mold for use in the manufacture of pottery, comprising a plurality of cooperating, movably mounted mold sections, and a piston member mounted to cooperate with said sections.

39. A partible mold for use in the manufacture of pottery, comprising a plurality of cooperating body sections, and a plurality of sub-sections of absorbent material which form the mold proper removably and replaceably mounted in said body sections.

40. A partible mold for use in the manufacture of pottery, comprising a frame, a plurality of cooperating mold sections carrying the mold proper slidably and resiliently mounted relatively to said frame, a piston member provided with ports, and a means for applying super and (or) sub-atmospheric pressure to said piston to impart sliding movement to said mold sections.

41. In apparatus of the class specified, in combination, a mold comprising a frame support formed with a seat for supporting and positioning ware and a plurality of movably mounted, normally abutting sections, and means for separating said sections, said frame being adapted to support and position the ware independent of said sections.

42. A partible mold for use in the manufacture of pottery, comprising a plurality of separable sections, and a removable and replaceable sectional porous mold proper mounted in said sections.

43. In apparatus of the class specified, a source of supply of plastic material in a fluid or semi-fluid state, a mold, and a means for automatically withdrawing said material from said source of supply and applying it in measured charges to said mold.

44. In apparatus of the class specified, a nozzle member, a mold, means for applying a charge of clay in a fluid or semi-fluid state to said mold through said member, and turn passage whereby the excess of fluid clay is withdrawn when the mold becomes filled in excess of a predetermined level.

45. In apparatus of the class specified, a mold formed with a cavity for ware, and a nozzle member provided with a chambered body and a mold-contacting member operating to definitely position said nozzle member relatively to said cavity.

46. In apparatus of the class specified, a nozzle member comprising a multiple of nozzles so constructed and arranged as to permit independent vertical adjustment.

47. In apparatus of the class specified, a nozzle member comprising a chambered body terminating in a supply nozzle, a supplemental nozzle surrounding said supply nozzle, a mold-contacting and nozzle centering member, said supply nozzle, supplemental nozzle and last named member being so constructed and arranged as to permit vertical adjustment of one or two of said elements without affecting the vertical position of the remaining element or elements.

48. In apparatus of the class specified, a device for charging molds with clay in a fluid or semi-fluid state, and a means for adjusting said device while in operation to measure the quantity of clay comprised in a charge and/or time of application of the charge.

49. In apparatus of the class specified, a measuring and charging device comprising a chambered body, an impeller mounted to operate in said chamber, and means for adjusting the phase of operation of said impeller while the driving connection subsists.

50. In apparatus of the class specified, a slip reservoir provided with a conduit terminating in a nozzle member, a mold, means for automatically maintaining a constant level of slip in said reservoir, and means for giving a preliminary impulse to the slip to initiate a flow by gravity into the mold.

51. In apparatus of the class specified, in combination, a conveyor, provided with positioning members, mold-carrying trays mounted in said conveyor, means for intermittently driving said conveyor, and a positioning device mounted adjacent the path of travel of said conveyor adapted to automatically register with said first-named positioning members to definitely spot the position of rest of said conveyor.

52. In apparatus of the class specified, in combination, a conveyor, mold-carrying trays mounted in said conveyor, partible molds carried by said trays, and means for introducing fluid pressure to said molds to open and/or close the latter.

53. In apparatus of the class specified, in combination, a conveyor, mold-carrying trays mounted in said conveyor, partible molds carried by said trays, conduit members connected to said molds, and a means for introducing a fluid medium to said molds through said trays and conduits.

54. In apparatus of the class specified, a movably mounted tray, partible molds carried by said tray, said molds comprising movably mounted, normally abutting cooperating sections, and a means for retracting said sections from abutting relation at predetermined points along the path of movement of said tray.

55. In apparatus of the class specified, in combination, a partible mold, means for applying a fluid medium to said mold to part the latter, and means for regulating the dwell and/or time of application of said medium.

56. In apparatus of the class specified, a valve, cam means for actuating said valve, and means for adjusting the position of said cam means while operating to actuate the said valve.

57. The method of applying appendages such as figures and the like to ware in the manufacture of pottery, which consists in providing a partible mold with a cavity defining the appendage, charging said cavity with clay in a fluid or semi-fluid state, disposing an article of ware on said cavity against the clay, and subsequently applying super-atmospheric pressure to repel the clay from the walls of the cavity and/or part the mold.

58. The method of applying appendages such as handles, figures and the like to ware in the manufacture of pottery, which consists in providing a mold with a cavity defining the appendage, charging said cavity with clay in a fluid or semi-fluid state, conditioning the appendage to a predetermined extent, superimposing an additional measured terminal charge of said clay and subsequently removing the bonded appendage and ware from the mold.

59. The method of applying appendages such as handles, figures and the like to ware in the maunfacture of pottery, which consists in conveying the ware through a drier in forming molds, providing a series of appendage molds formed with cavities defining the appendage, conveying said appendage molds successively into charging position and charging each mold with a measured quantity of slip in excess of its normal capacity, transferring the ware from said forming molds and joining it to the appendages in said appendage molds, subsequently applying super-atmospheric pressure to prevent adhesion of the appendages to the molds, and retransferring the ware to said forming molds.

60. The method of applying appendages such as handles, figures and the like to ware in the manufacture of pottery, which consists in conveying the ware through a drier in forming molds, providing a series of partible molds formed with cavities defining the appendage, conveying said partible molds successively into charging position and charging each mold with a measured quantity of slip in excess of a predetermined level applying sub-atmosphere to remove excess slip, transferring the ware from said forming molds and joining it to the appendage in said partible molds, subsequently applying super and (or) sub-atmsophere to said partible molds to repel the handle or figure from the walls of the cavities and part said molds, and retransferring and boxing the ware.

61. In the manufacture of pottery, the method which consists in delivering a charge of material in a fluid state to a mold in excess of the quantity required to fill the mold to a predetermined level, and maintaining the level constant by removing the excess material as delivered.

62. In the manufacture of pottery, the method which consists in delivering substantially uniform charges of slip to a plurality of molds having cavities of varying capacities, the minimum quantity of slip in each charge being sufficient to fill the largest mold cavity, and maintaining the level of slip in each mold constant by removing the excess slip as delivered.

63. The method of forming spouts, hollow handles and the like in the manufacture of pottery, which consists in providing a porous mold with a cavity defining the handle or spout, charging said cavity with clay slip, the porous walls of the cavity absorbing moisture from the slip and the clay forming an outer shell against the walls of the cavity, and applying air under pressure to force the fluid core from the shell.

64. Apparatus for applying appendages to ware in the manufacture of pottery, comprising in combination, an appendage mold, means for charging said mold with a series of measured charges of clay in a fluid or semi-fluid state, and means for predetermining the time interval between successive charges and/or volume of each charge.

65. The method of applying appendages to ware in the manufacture of pottery, which consists in providing a gated mould with a cavity defining the appendage and terminating in ware contacting edges, disposing an article of leather-hard ware against the open end of said cavity, applying sub-atmospheric pressure to the walls of the ware to impregnate said walls and substantially applying a charge of clay in a fluid or semi-fluid state to said cavity through said gate.

66. A partible mold for use in the manufacture of pottery comprising a plurality of cooperating mold sections, adapted to be moved one relative to the other and means for maintaining the ware in predetermined position in the molds while parting said sections.

67. A partible mold for use in the manufacture of pottery comprising a plurality of cooperating mold sections, adapted to be moved one relative to the other and means for selectively applying fluid pressure to the ware through the mold sections to maintain the ware in a predetermined position in the mold while parting said sections.

Signed by me this 28th day of March, 1928.

WILLIAM J. MILLER.

CERTIFICATE OF CORRECTION.

Patent No. 1,838,277.  Granted December 29, 1931, to

WILLIAM J. MILLER.

It is hereby certified that error appears in the printed specification of the above numbered patent requiring correction as follows: Page 21, line 54, claim 44, for "turn" read a return; and that the said Letters Patent should be read with this correction therein that the same may conform to the record of the case in the Patent Office.

Signed and sealed this 23rd day of February, A. D. 1932.

(Seal)

M. J. Moore,
Acting Commissioner of Patents.

CERTIFICATE OF CORRECTION.

Patent No. 1,838,277. December 29, 1931.

WILLIAM J. MILLER.

It is hereby certified that error appears in the printed specification of the above numbered patent requiring correction as follows: Page 22, line 110, claim 65, for the word "substantially" read subsequently; and that the said Letters Patent should be read with this correction therein that the same may conform to the record of the case in the Patent Office.

Signed and sealed this 9th day of March, A. D. 1937.

(Seal)

Henry Van Arsdale
Acting Commissioner of Patents.